US010499247B2

(12) United States Patent
Huber et al.

(10) Patent No.: US 10,499,247 B2
(45) Date of Patent: Dec. 3, 2019

(54) ADMINISTRATION OF ACCESS LISTS FOR FEMTOCELL SERVICE

(71) Applicant: AT&T Mobility II LLC, Atlanta, GA (US)

(72) Inventors: Kurt Donald Huber, Coral Springs, FL (US); William Gordon Mansfield, Sugar Hill, GA (US); Robert Wayne Lott, Cumming, GA (US); Judson John Flynn, Decatur, GA (US); Arthur Brisebois, Cumming, GA (US); Jefferey Thomas Seymour, Douglasville, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/354,954

(22) Filed: Nov. 17, 2016

(65) Prior Publication Data
US 2017/0070889 A1   Mar. 9, 2017

Related U.S. Application Data

(63) Continuation of application No. 14/219,543, filed on Mar. 19, 2014, now Pat. No. 9,503,457, which is a (Continued)

(51) Int. Cl.
H04W 12/08 (2009.01)
H04W 84/04 (2009.01)
(Continued)

(52) U.S. Cl.
CPC ......... H04W 12/08 (2013.01); H04L 43/0811 (2013.01); H04L 63/101 (2013.01);
(Continued)

(58) Field of Classification Search
CPC ..... H04W 84/045; H04W 40/20; H04W 4/02; H04W 36/32; H04W 36/0083; H04L 65/1006; H04L 65/1016; H04L 43/0811
See application file for complete search history.

(56) References Cited

U.S. PATENT DOCUMENTS 5,050,163 A    9/1991  Van Bavel et al.
5,564,016 A   10/1996  Korenshtein
(Continued)

FOREIGN PATENT DOCUMENTS

CN    1429005 A    7/2003
CN   101017554     8/2007
(Continued)

OTHER PUBLICATIONS

International Search Report and Written Opinion dated Oct. 27, 2009 for PCT Application U.S. Appl. No. PCT/US2009/043861, 14 Pages.
(Continued)

Primary Examiner — Chirag R Patel
(74) Attorney, Agent, or Firm — Amin, Turocy & Watson, LLP

(57) ABSTRACT

A subscriber account associated with a femtocell can be managed and access can be provided thereto. The account service management can be accessed through a broadband network and comprises two operational layers deployed within respective demarcation zones. A first layer includes a web tier that provides landing webpage and a legacy account manager that enables account management for mobility subscribers. A second layer includes an application layer associated with femtocell service, an application layer for legacy accounts, and a middleware component that provides functional connectivity application layers and backend service component. Account management service allows secure login to femtocell account and redirection amongst femto-
(Continued)

cell and legacy service components, and enables manipulation of access list(s) that regulate access to femto service. A femtocell database retains account profile(s) that include access list(s). Access list(s) and updates thereof can be supplied to macrocell network.

20 Claims, 17 Drawing Sheets

Related U.S. Application Data continuation of application No. 12/465,598, filed on May 13, 2009, now Pat. No. 8,719,420.

(60) Provisional application No. 61/061,082, filed on Jun. 12, 2008, provisional application No. 61/052,813, filed on May 13, 2008.

(51) Int. Cl.
*H04W 40/20* (2009.01)
*H04W 36/32* (2009.01)
*H04W 36/00* (2009.01)
*H04L 12/26* (2006.01)
*H04L 29/06* (2006.01)
*H04W 76/12* (2018.01)
*H04W 76/10* (2018.01)
*H04M 1/725* (2006.01)
*H04W 8/20* (2009.01)

(52) U.S. Cl.
CPC ....... *H04W 36/0083* (2013.01); *H04W 36/32* (2013.01); *H04W 40/20* (2013.01); *H04W 76/10* (2018.02); *H04W 76/12* (2018.02); *H04W 84/045* (2013.01); *H04M 1/72572* (2013.01); *H04W 8/205* (2013.01)

(56) References Cited

U.S. PATENT DOCUMENTS

| | | | |
|---|---|---|---|
| 5,726,984 A | 3/1998 | Kubler et al. |
| 5,745,559 A | 4/1998 | Weir |
| 5,864,764 A | 1/1999 | Thro et al. |
| 5,950,125 A | 9/1999 | Buhrmann et al. |
| 5,956,715 A | 9/1999 | Glasser et al. |
| 5,958,006 A | 9/1999 | Eggleston et al. |
| 5,983,097 A | 11/1999 | Kakinuma et al. |
| 6,052,594 A | 4/2000 | Chuang et al. |
| 6,151,505 A | 11/2000 | Larkins |
| 6,189,032 B1 | 2/2001 | Susaki et al. |
| 6,208,659 B1 | 3/2001 | Govindarajan et al. |
| 6,219,786 B1 | 4/2001 | Cunningham et al. |
| 6,256,504 B1 | 7/2001 | Tell et al. |
| 6,266,537 B1 | 7/2001 | Kashitani et al. |
| 6,295,454 B1 | 9/2001 | Havinis et al. |
| 6,363,261 B1 | 3/2002 | Raghavan |
| 6,477,367 B1 | 11/2002 | Kim |
| 6,483,852 B1 | 11/2002 | Jacquet et al. |
| 6,484,096 B2 | 11/2002 | Wong |
| 6,512,478 B1 | 1/2003 | Chien |
| 6,681,099 B1 | 1/2004 | Keranen et al. |
| 6,710,651 B2 | 3/2004 | Forrester |
| 6,714,969 B1 | 3/2004 | Klein et al. |
| 6,718,023 B1 | 4/2004 | Zolotov |
| 6,768,722 B1 | 7/2004 | Katseff et al. |
| 7,080,139 B1 | 7/2006 | Briggs et al. |
| 7,142,861 B2 | 11/2006 | Murai |
| 7,146,153 B2 | 12/2006 | Russell |
| 7,155,526 B2 | 12/2006 | Chaudhary et al. |
| 7,209,739 B1 | 4/2007 | Narayanabhatla |
| 7,218,912 B2 | 5/2007 | Erskine et al. |
| 7,225,263 B1 | 5/2007 | Clymer et al. |
| 7,277,410 B2 | 10/2007 | Horneman |
| 7,317,931 B2 | 1/2008 | Guo |
| 7,370,356 B1 | 5/2008 | Guo |
| 7,437,755 B2 | 10/2008 | Farino et al. |
| 7,483,984 B1 * | 1/2009 | Jonker .................. H04L 41/22 |
| | | | 709/203 |
| 7,493,390 B2 | 2/2009 | Bobde et al. |
| 7,496,383 B2 | 2/2009 | Kurata |
| 7,505,825 B2 | 3/2009 | Wilson et al. |
| 7,509,124 B2 | 3/2009 | O'Neil |
| 7,516,219 B2 | 4/2009 | Moghaddam et al. |
| 7,551,574 B1 | 6/2009 | Peden et al. |
| 7,558,251 B1 | 7/2009 | Huang et al. |
| 7,570,625 B1 | 8/2009 | Ocepek |
| 7,574,731 B2 | 8/2009 | Fascenda et al. |
| 7,613,154 B2 | 11/2009 | Caspi et al. |
| 7,613,444 B2 | 11/2009 | Lindqvist et al. |
| 7,614,078 B1 | 11/2009 | Stieglitz et al. |
| 7,623,857 B1 | 11/2009 | O'Neil |
| 7,633,910 B2 | 12/2009 | Zhun et al. |
| 7,751,826 B2 | 7/2010 | Gardner |
| 7,761,526 B2 | 7/2010 | Pounds et al. |
| 7,768,983 B2 | 8/2010 | Nylander et al. |
| 7,853,265 B1 | 12/2010 | Ahmad |
| 7,885,644 B2 | 2/2011 | Gallagher et al. |
| 7,912,464 B2 * | 3/2011 | Jiang ...................... H04W 8/26 |
| | | | 455/432.1 |
| 7,929,537 B2 | 4/2011 | Vasudevan et al. |
| 7,929,970 B1 | 4/2011 | Gunasekara |
| 7,941,144 B2 | 5/2011 | Nylander et al. |
| 7,995,994 B2 | 8/2011 | Khetawat et al. |
| 8,041,335 B2 | 10/2011 | Khetawat et al. |
| 8,045,530 B2 * | 10/2011 | Haverinen ............. H04L 29/12 |
| | | | 370/328 |
| 8,064,909 B2 | 11/2011 | Spinelli et al. |
| 8,098,597 B2 | 1/2012 | Semper |
| 8,103,285 B2 | 1/2012 | Kalhan et al. |
| 8,108,923 B1 | 1/2012 | Satish et al. |
| 8,265,685 B2 | 9/2012 | Vikberg et al. |
| 8,437,745 B2 | 5/2013 | Theppasaandra et al. |
| 8,494,522 B2 * | 7/2013 | Chen ...................... H04W 60/00 |
| | | | 455/432.1 |
| 8,509,778 B2 | 8/2013 | Buchmayer et al. |
| 8,510,801 B2 | 8/2013 | Majumdar et al. |
| 8,522,312 B2 | 8/2013 | Huber et al. |
| 8,538,410 B2 | 9/2013 | Karim et al. |
| 8,588,056 B1 | 11/2013 | Choi et al. |
| 8,743,776 B2 | 6/2014 | Gurajala et al. |
| 8,774,155 B2 | 7/2014 | Passarella et al. |
| 8,856,878 B2 | 10/2014 | Wohlert |
| 2001/0021884 A1 | 9/2001 | Shinyagaito |
| 2001/0029425 A1 | 10/2001 | Myr |
| 2001/0046225 A1 | 11/2001 | Schwaller et al. |
| 2002/0044639 A1 | 4/2002 | Shioda et al. |
| 2002/0075844 A1 | 6/2002 | Hagen |
| 2002/0077115 A1 | 6/2002 | Ruutu et al. |
| 2002/0095513 A1 | 7/2002 | Lin et al. |
| 2002/0098837 A1 | 7/2002 | Ferrario et al. |
| 2002/0120723 A1 | 8/2002 | Forth et al. |
| 2002/0123365 A1 | 9/2002 | Thorson |
| 2002/0107018 A1 | 10/2002 | Nakamura et al. |
| 2002/0142791 A1 | 10/2002 | Chen et al. |
| 2002/0159545 A1 | 10/2002 | Ramesh et al. |
| 2002/0169986 A1 | 11/2002 | Lortz |
| 2002/0196187 A1 | 12/2002 | Holt |
| 2003/0028621 A1 | 2/2003 | Furlong et al. |
| 2003/0101254 A1 | 5/2003 | Sato |
| 2003/0109271 A1 | 6/2003 | Lewis et al. |
| 2003/0125042 A1 | 7/2003 | Olrik et al. |
| 2003/0125044 A1 | 7/2003 | Deloach |
| 2003/0125048 A1 | 7/2003 | Lockhart et al. |
| 2003/0133558 A1 | 7/2003 | Kung et al. |
| 2003/0139180 A1 | 7/2003 | McIntosh et al. |
| 2003/0142637 A1 | 7/2003 | Khawer et al. |
| 2003/0144793 A1 | 7/2003 | Melaku et al. |
| 2003/0153302 A1 | 8/2003 | Lewis et al. |
| 2003/0185375 A1 | 10/2003 | Albal |
| 2004/0003285 A1 | 1/2004 | Whelan |
| 2004/0027278 A1 | 2/2004 | Park |
| 2004/0052248 A1 | 3/2004 | Frank et al. |

(56) References Cited

U.S. PATENT DOCUMENTS

| | | |
|---|---|---|
| 2004/0106434 A1 | 6/2004 | Shibasaki |
| 2004/0111382 A1 | 6/2004 | Haji-Ioannou |
| 2004/0125781 A1 | 7/2004 | Walter et al. |
| 2004/0139201 A1 | 7/2004 | Chaudhary et al. |
| 2004/0165546 A1 | 8/2004 | Roskind |
| 2004/0203846 A1 | 10/2004 | Caronni et al. |
| 2004/0208151 A1 | 10/2004 | Haverinen et al. |
| 2004/0235455 A1 | 11/2004 | Jiang |
| 2004/0236702 A1 | 11/2004 | Fink et al. |
| 2004/0258003 A1 | 12/2004 | Kotot et al. |
| 2004/0264428 A1 | 12/2004 | Choi et al. |
| 2005/0003797 A1 | 1/2005 | Baldwin |
| 2005/0009499 A1 | 1/2005 | Koster |
| 2005/0020216 A1 | 1/2005 | Bune |
| 2005/0024201 A1 | 2/2005 | Culpepper et al. |
| 2005/0026650 A1 | 2/2005 | Russell |
| 2005/0030929 A1 | 2/2005 | Swier |
| 2005/0075114 A1 | 4/2005 | Dennison et al. |
| 2005/0108257 A1 | 5/2005 | Ishii et al. |
| 2005/0108529 A1 | 5/2005 | Juneau |
| 2005/0122977 A1 | 6/2005 | Lieberman |
| 2005/0135375 A1 | 6/2005 | Hurtta et al. |
| 2005/0138178 A1 | 6/2005 | Astarabadi |
| 2005/0143057 A1 | 6/2005 | Shiraga et al. |
| 2005/0144279 A1 | 6/2005 | Wexelblat |
| 2005/0154924 A1* | 7/2005 | Scheidt .................. G06F 21/31 726/19 |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0223389 A1 | 10/2005 | Klein et al. |
| 2005/0239448 A1 | 10/2005 | Bayne |
| 2005/0239498 A1 | 10/2005 | Saifullah et al. |
| 2005/0243057 A1 | 11/2005 | Sugiyama et al. |
| 2005/0249117 A1 | 11/2005 | Gerkins |
| 2005/0250527 A1 | 11/2005 | Jugl |
| 2005/0251326 A1 | 11/2005 | Reeves |
| 2005/0254451 A1 | 11/2005 | Grosbach |
| 2005/0255893 A1 | 11/2005 | Jin et al. |
| 2005/0259654 A1 | 11/2005 | Faulk, Jr. |
| 2005/0269402 A1 | 12/2005 | Spitzer et al. |
| 2005/0283518 A1 | 12/2005 | Sargent |
| 2006/0003775 A1 | 1/2006 | Bull et al. |
| 2006/0031387 A1 | 2/2006 | Hamzeh et al. |
| 2006/0031493 A1 | 2/2006 | Cugi |
| 2006/0046647 A1 | 3/2006 | Parikh et al. |
| 2006/0074814 A1 | 4/2006 | Lovell et al. |
| 2006/0075098 A1 | 4/2006 | Becker et al. |
| 2006/0101019 A1 | 5/2006 | Nelson et al. |
| 2006/0107327 A1 | 5/2006 | Sprigg et al. |
| 2006/0182074 A1 | 8/2006 | Kubler et al. |
| 2006/0223498 A1 | 10/2006 | Gallagher et al. |
| 2006/0224750 A1 | 10/2006 | Davies et al. |
| 2006/0244589 A1 | 11/2006 | Schranz |
| 2006/0268767 A1 | 11/2006 | Sato et al. |
| 2006/0268834 A1 | 11/2006 | Bajic |
| 2006/0281457 A1 | 12/2006 | Huotari et al. |
| 2006/0291448 A1 | 12/2006 | Hellgren et al. |
| 2007/0002844 A1 | 1/2007 | Ali |
| 2007/0008894 A1 | 1/2007 | Lynch et al. |
| 2007/0025245 A1 | 2/2007 | Porras et al. |
| 2007/0032225 A1 | 2/2007 | Konicek et al. |
| 2007/0032269 A1 | 2/2007 | Shostak |
| 2007/0041350 A1 | 2/2007 | Famolari |
| 2007/0047480 A1 | 3/2007 | Suga |
| 2007/0061889 A1 | 3/2007 | Sainaney |
| 2007/0066318 A1 | 3/2007 | Danzeisen et al. |
| 2007/0074272 A1 | 3/2007 | Watanabe |
| 2007/0097983 A1 | 3/2007 | Nylander et al. |
| 2007/0083470 A1 | 4/2007 | Bonner et al. |
| 2007/0094601 A1 | 4/2007 | Greenberg et al. |
| 2007/0094716 A1 | 4/2007 | Farino |
| 2007/0097093 A1 | 5/2007 | Oshita et al. |
| 2007/0097938 A1 | 5/2007 | Nylander et al. |
| 2007/0097939 A1 | 5/2007 | Nylander et al. |
| 2007/0099561 A1 | 5/2007 | Voss |
| 2007/0104166 A1 | 5/2007 | Rahman et al. |
| 2007/0109101 A1 | 5/2007 | Colby |
| 2007/0111706 A1 | 5/2007 | Kumar et al. |
| 2007/0123253 A1 | 5/2007 | Simongini et al. |
| 2007/0124802 A1 | 5/2007 | Anton et al. |
| 2007/0129045 A1 | 6/2007 | Aerrabotu |
| 2007/0133563 A1 | 6/2007 | Hundscheidt et al. |
| 2007/0150732 A1 | 6/2007 | Hidehiko et al. |
| 2007/0155421 A1 | 7/2007 | Alberth et al. |
| 2007/0167175 A1 | 7/2007 | Wong |
| 2007/0183427 A1 | 8/2007 | Nylander et al. |
| 2007/0184815 A1 | 8/2007 | Aebi |
| 2007/0184841 A1 | 8/2007 | Choi et al. |
| 2007/0199076 A1 | 8/2007 | Rensin et al. |
| 2007/0220252 A1 | 9/2007 | Sinko et al. |
| 2007/0225029 A1 | 9/2007 | Abusch-Magder |
| 2007/0226233 A1* | 9/2007 | Walter ................ G06F 17/3056 |
| 2007/0232332 A1 | 10/2007 | Holur et al. |
| 2007/0258418 A1 | 11/2007 | Wurtenberger et al. |
| 2007/0263608 A1 | 11/2007 | Han et al. |
| 2007/0270152 A1 | 11/2007 | Nylander et al. |
| 2007/0275739 A1 | 11/2007 | Blackburn |
| 2007/0287501 A1 | 12/2007 | Hoshina |
| 2007/0297373 A1 | 12/2007 | Saifullah et al. |
| 2008/0005302 A1 | 1/2008 | Speicher et al. |
| 2008/0011910 A1 | 1/2008 | Ramsey |
| 2008/0022183 A1 | 1/2008 | Arslan et al. |
| 2008/0039089 A1 | 2/2008 | Berkman et al. |
| 2008/0043972 A1 | 2/2008 | Ruetschi et al. |
| 2008/0049702 A1 | 2/2008 | Meylan et al. |
| 2008/0065752 A1 | 3/2008 | Ch'ng et al. |
| 2008/0069028 A1 | 3/2008 | Richardson |
| 2008/0070547 A1 | 3/2008 | Schreyer |
| 2008/0072292 A1 | 3/2008 | Narjala |
| 2008/0076386 A1 | 3/2008 | Khetawat |
| 2008/0076392 A1 | 3/2008 | Khetawat et al. |
| 2008/0076393 A1 | 3/2008 | Khetawat et al. |
| 2008/0076398 A1 | 3/2008 | Mate et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0082538 A1 | 4/2008 | Meijer et al. |
| 2008/0084291 A1 | 4/2008 | Campion et al. |
| 2008/0109276 A1* | 5/2008 | Ionfrida .................. G06F 8/20 717/104 |
| 2008/0119160 A1 | 5/2008 | Andriantsiferana et al. |
| 2008/0126531 A1 | 5/2008 | Setia et al. |
| 2008/0132239 A1 | 6/2008 | Khetawat et al. |
| 2008/0133742 A1 | 6/2008 | Southiere et al. |
| 2008/0141348 A1 | 6/2008 | Hovnanian et al. |
| 2008/0151807 A1 | 6/2008 | Meier et al. |
| 2008/0155649 A1 | 6/2008 | Maler et al. |
| 2008/0162489 A1 | 7/2008 | Reponen et al. |
| 2008/0168099 A1 | 7/2008 | Skaf |
| 2008/0181184 A1 | 7/2008 | Kezys |
| 2008/0201076 A1 | 8/2008 | Huang et al. |
| 2008/0207170 A1 | 8/2008 | Khetawat et al. |
| 2008/0242280 A1 | 10/2008 | Shapiro et al. |
| 2008/0244148 A1 | 10/2008 | Nix et al. |
| 2008/0254792 A1 | 10/2008 | Ch'ng |
| 2008/0254807 A1 | 10/2008 | Duplessis et al. |
| 2008/0261602 A1 | 10/2008 | Livneh |
| 2008/0274753 A1 | 11/2008 | Attar et al. |
| 2008/0281687 A1 | 11/2008 | Hurwitz et al. |
| 2008/0282327 A1 | 11/2008 | Winget et al. |
| 2008/0293382 A1 | 11/2008 | Lubenski et al. |
| 2008/0293433 A1 | 11/2008 | Wallis |
| 2008/0299984 A1 | 12/2008 | Shimomura |
| 2008/0299992 A1 | 12/2008 | Eitan et al. |
| 2008/0305792 A1 | 12/2008 | Khetawat et al. |
| 2008/0305801 A1 | 12/2008 | Burgess et al. |
| 2008/0305834 A1 | 12/2008 | Janiszewski et al. |
| 2008/0318551 A1 | 12/2008 | Palamara et al. |
| 2009/0012898 A1 | 1/2009 | Sharma et al. |
| 2009/0016279 A1 | 1/2009 | Beser |
| 2009/0017823 A1 | 1/2009 | Sachs et al. |

(56) References Cited

U.S. PATENT DOCUMENTS

| | | |
|---|---|---|
| 2009/0031006 A1 | 1/2009 | Johnson et al. |
| 2009/0037973 A1 | 2/2009 | Gustave et al. |
| 2009/0042593 A1 | 2/2009 | Yavuz et al. |
| 2009/0046632 A1 | 2/2009 | Nanda et al. |
| 2009/0046665 A1 | 2/2009 | Robson et al. |
| 2009/0047945 A1 | 2/2009 | Zhang |
| 2009/0059822 A1 | 3/2009 | Morrill et al. |
| 2009/0061821 A1 | 3/2009 | Chen et al. |
| 2009/0061873 A1 | 3/2009 | Baa et al. |
| 2009/0077620 A1 | 3/2009 | Ravi et al. |
| 2009/0082010 A1 | 3/2009 | Lee |
| 2009/0082020 A1 | 3/2009 | Ch'ng et al. |
| 2009/0092080 A1 | 4/2009 | Balasubramanian et al. |
| 2009/0092081 A1 | 4/2009 | Balasubramanian et al. |
| 2009/0092096 A1 | 4/2009 | Czaja |
| 2009/0092097 A1 | 4/2009 | Nylander et al. |
| 2009/0093232 A1 | 4/2009 | Gupta et al. |
| 2009/0094351 A1 | 4/2009 | Gupta et al. |
| 2009/0094680 A1 | 4/2009 | Gupta et al. |
| 2009/0097436 A1 | 4/2009 | Vasudevan et al. |
| 2009/0098858 A1 | 4/2009 | Gogic |
| 2009/0098871 A1 | 4/2009 | Gogic |
| 2009/0109979 A1 | 4/2009 | Tong |
| 2009/0111499 A1 | 4/2009 | Bosch |
| 2009/0119750 A1 | 5/2009 | Sembugamoorthy et al. |
| 2009/0122773 A1 | 5/2009 | Gogic |
| 2009/0124262 A1 | 5/2009 | Vela et al. |
| 2009/0129336 A1 | 5/2009 | Osborn et al. |
| 2009/0129350 A1 | 5/2009 | Khandekar et al. |
| 2009/0131050 A1 | 5/2009 | Osborn |
| 2009/0131098 A1 | 5/2009 | Khandekar et al. |
| 2009/0132674 A1 | 5/2009 | Horn et al. |
| 2009/0135749 A1 | 5/2009 | Yang |
| 2009/0135794 A1 | 5/2009 | Su et al. |
| 2009/0156213 A1 | 6/2009 | Spinelli et al. |
| 2009/0161682 A1 | 6/2009 | Johnson et al. |
| 2009/0163202 A1 | 6/2009 | Humblet et al. |
| 2009/0163216 A1* | 6/2009 | Hoang .............. H04W 36/0055 455/450 |
| 2009/0163224 A1 | 6/2009 | Dean |
| 2009/0164547 A1 | 6/2009 | Ch'ng et al. |
| 2009/0170440 A1 | 7/2009 | Eyuboglu et al. |
| 2009/0170528 A1 | 7/2009 | Bull et al. |
| 2009/0180428 A1 | 7/2009 | Viswanath |
| 2009/0191844 A1 | 7/2009 | Morgan et al. |
| 2009/0191845 A1 | 7/2009 | Morgan et al. |
| 2009/0210324 A1 | 8/2009 | Bhogal |
| 2009/0213825 A1 | 8/2009 | Gupta et al. |
| 2009/0215429 A1 | 8/2009 | Caldwell et al. |
| 2009/0215452 A1 | 8/2009 | Balasubramanian et al. |
| 2009/0217353 A1 | 8/2009 | Zheng |
| 2009/0221303 A1 | 9/2009 | Soliman |
| 2009/0233574 A1 | 9/2009 | Shinozaki |
| 2009/0245176 A1 | 10/2009 | Balasubramanian et al. |
| 2009/0247157 A1 | 10/2009 | Yoon et al. |
| 2009/0247170 A1 | 10/2009 | Balasubramanian et al. |
| 2009/0253421 A1 | 10/2009 | Camp et al. |
| 2009/0253432 A1 | 10/2009 | Willey et al. |
| 2009/0257434 A1 | 10/2009 | Song et al. |
| 2009/0279701 A1 | 11/2009 | Moisand et al. |
| 2009/0286512 A1 | 11/2009 | Huber et al. |
| 2009/0288152 A1 | 11/2009 | Huber |
| 2009/0291667 A1 | 11/2009 | Vakil et al. |
| 2009/0299788 A1 | 12/2009 | Huber et al. |
| 2009/0305699 A1 | 12/2009 | Deshpande et al. |
| 2009/0311987 A1 | 12/2009 | Edge et al. |
| 2009/0325634 A1 | 12/2009 | Bienas et al. |
| 2010/0022266 A1 | 1/2010 | Villier |
| 2010/0027469 A1 | 2/2010 | Gurajala et al. |
| 2010/0040026 A1 | 2/2010 | Melkesetian |
| 2010/0048165 A1 | 2/2010 | Caldwell et al. |
| 2010/0056104 A1 | 3/2010 | Butler |
| 2010/0075658 A1 | 3/2010 | Hou |
| 2010/0113067 A1 | 5/2010 | Fullam et al. |
| 2010/0135201 A1 | 6/2010 | Lewis et al. |
| 2010/0136984 A1 | 6/2010 | Brisebois |
| 2010/0157941 A1 | 6/2010 | Raghothaman |
| 2010/0167771 A1 | 7/2010 | Raghothaman et al. |
| 2010/0167777 A1 | 7/2010 | Raghothaman et al. |
| 2010/0240398 A1 | 9/2010 | Hotes et al. |
| 2010/0260068 A1 | 10/2010 | Bhatt et al. |
| 2010/0271962 A1 | 10/2010 | Han |
| 2010/0304712 A1 | 12/2010 | Sweeney et al. |
| 2011/0055928 A1 | 3/2011 | Brindza |
| 2011/0086614 A1 | 4/2011 | Brisebois et al. |
| 2011/0134837 A1 | 6/2011 | Wang et al. |
| 2011/0177794 A1 | 7/2011 | Nylander et al. |
| 2011/0200022 A1 | 8/2011 | Annamalai |
| 2011/0280154 A1 | 11/2011 | Silverstrim et al. |
| 2012/0135712 A1 | 5/2012 | Bari |
| 2012/0258711 A1 | 10/2012 | Bao et al. |
| 2013/0165079 A1 | 6/2013 | Gogic |

FOREIGN PATENT DOCUMENTS

| | | |
|---|---|---|
| CN | 101175333 A | 5/2008 |
| EP | 2286569 | 2/2011 |
| FR | 2 907 290 A1 | 4/2008 |
| GB | 2425291 A | 10/2006 |
| GB | 2425921 A | 11/2006 |
| GB | 2 428 942 A | 2/2007 |
| JP | 20010264096 | 9/2001 |
| JP | 2002-117067 A | 4/2002 |
| JP | 2003022303 | 1/2003 |
| JP | 2003-288521 A | 10/2003 |
| JP | 2003088521 | 10/2003 |
| JP | 2004112324 | 4/2004 |
| JP | 2005073147 | 3/2005 |
| JP | 2005215849 | 8/2005 |
| JP | 2006-067143 A | 3/2006 |
| JP | 20060674143 | 3/2006 |
| JP | 2007-180998 A | 7/2007 |
| JP | 2007-522564 A | 8/2007 |
| JP | 2008048055 | 2/2008 |
| JP | 2009-504048 A | 1/2009 |
| JP | 2009-510969 A | 3/2009 |
| JP | 2010-507306 A | 3/2010 |
| WO | 02-14987 A2 | 2/2002 |
| WO | 2005076964 A2 | 8/2005 |
| WO | 2007012083 A2 | 1/2007 |
| WO | 2007015067 A2 | 2/2007 |
| WO | 2007040449 A1 | 4/2007 |
| WO | 2008047039 A1 | 4/2008 |

OTHER PUBLICATIONS

International Search Report and Written Opinion dated Feb. 23, 2010, for PCT Application No. PCT/US2009/043846, 13 pages.

Office Action dated Dec. 31, 2009 for U.S. Appl. No. 11/457,129, 16 pages.

Office Action dated Apr. 17, 2009 for U.S. Appl. No. 11/276,269, 15 pages.

Office Action dated Nov. 4, 2008 for U.S. Appl. No. 11/276,269, 15 pages.

Office Action dated Jun. 17, 2010 for U.S. Appl. No. 11/457,129, 15 pages.

Kaul, "Verizon's $250 femto box—A deliberate ploy behind the aggressive pricing?" Posted Tue, Jan. 20, 2009 13:19:46 EST; http://www.abiresearch.com/research_blog/569; © 2009 Allied Business Intelligence, Inc.

Office Action dated Mar. 29, 2011 for U.S. Appl. No. 12/276,002, 37 pages.

Office Action dated Apr. 13, 2011 for U.S. Appl. No. 12/276,058, 40 pages.

Office Action dated Apr. 19, 2011 for U.S. Appl. No. 12/276,238, 22 pages.

Office Action dated May 5, 2011 for U.S. Appl. No. 12/275,015, 32 pages.

Office Action dated Jun. 14, 2011 for U.S. Appl. No. 12/275,878, 35 pages.

(56) References Cited

OTHER PUBLICATIONS

Office Action dated Jun. 22, 2011 for U.S. Appl. No. 12/484,072, 38 pages.
Office Action dated Jul. 7, 2011 for U.S. Appl. No. 12/276,257, 24 pages.
Office Action dated Jun. 28, 2011 for U.S. Appl. No. 12/275,925, 18 pages.
Office Action dated Jun. 8, 2011 for U.S. Appl. No. 12/484,026, 30 pages.
Office Action dated Aug. 18, 2011 for U.S. Appl. No. 12/275,416, 39 pages.
Office Action dated Sep. 14, 2011 for U.S. Appl. No. 12/276,002, 35 pages.
Dffice Action dated Oct. 5, 2011 for U.S. Appl. No. 12/276,058, 37 pages.
Office Action dated Oct. 6, 2011 for U.S. Appl. No. 12/465,483, 50 pages.
Office Action dated Oct. 4, 2011 for U.S. Appl. No. 12/484,135, 44 pages.
Office Action dated Jul. 21, 2011 for U.S. Appl. No. 12/175,293, 30 pages.
Office Action dated Oct. 24, 2011 for U.S. Appl. No. 12/275,925, 14 pages.
Office Action dated Nov. 30, 2011 for U.S. Appl. No. 12/275,878, 38 pages.
Office Action dated Dec. 1, 2011 for U.S. Appl. No. 12/275,996, 44 pgs.
Office Action dated Oct. 25, 2011 for U.S. Appl. No. 12/465,580, 39 pages.
Office Action dated Nov. 8, 2011 for U.S. Appl. No. 12/465,468, 50 pages.
Office Action dated Jan. 5, 2012 for U.S. Appl. No. 12465,585, 43 pages.
Office Action dated Dec. 28, 2011 for U.S. Appl. No. 12/175,293, 38 pages.
Office Action dated Nov. 21, 2011 for U.S. Appl. No. 12/484,026, 37 pages.
Office Action dated Dec. 14, 2011 for U.S. Appl. No. 12/484,072, 44 pages.
Office Action dated Nov. 1, 2011 for U.S. Appl. No. 12/816,087, 33 pages.
Office Action dated Mar. 5, 2012 for U.S. Appl. No. 12/465,598, 55 pages.
Office Action dated May 8, 2012 for U.S. Appl. No. 11/457,129, 38 pages.
Office Action dated Mar. 19, 2012 for U.S. Appl. No. 12/276,120, 68 pages.
Office Action dated Mar. 30, 2012 for U.S. Appl. No. 12/484,026, 30 pages.
Notice of Allowance dated Apr. 3, 2012 for U.S. Appl. No. 12/275,996, 38 pages.
Office Action dated Apr. 10, 2012 for U.S. Appl. No. 12/275,416, 32 pages.
Office Action dated Apr. 10, 2012 for U.S. Appl. No. 12/484,135, 45 pages.
Notice of Allowance dated Apr. 25, 2012 for U.S. Appl. No. 12/465,468, 35 pages.
Office Action dated Jul. 16, 2012 for U.S. Appl. No. 12/275,878, 37 pages.
Office Action dated Jul. 10, 2012 for U.S. Appl. No. 12/465,585, 32 pages.
Office Action dated Apr. 13, 2012 for U.S. Appl. No. 13/316,106, 35 pages.
Office Action dated Sep. 5, 2012 for U.S. Appl. No. 12/276,120, 49 pages.
Office Action dated Aug. 16, 2012 for U.S. Appl. No. 12/465,598, 31 pages.
Office Action dated Sep. 6, 2012 for U.S. Appl. No. 12/579,957, 51 pages.
Office Action dated Sep. 10, 2012 for U.S. Appl. No. 12/276,002, 54 pages.
Office Action dated Oct. 2, 2012 for U.S. Appl. No. 12/484,026, 29 pages.
Office Action dated Oct. 11, 2012 for U.S. Appl. No. 13/487,794, 45 pages.
Office Action dated Oct. 9, 2012 for U.S. Appl. No. 13/298,924, 51 pages.
Office Action dated Apr. 17, 2015 for U.S. Appl. No. 14/286,414, 55 Pages.
Office Action dated Mar. 30, 2015 for U.S. Appl. No. 14/219,543, 81 Pages.
Office Action dated Mar. 26, 2015 for U.S. Appl. No. 14/472,012, 62 Pages.
Office Action dated May 18, 2015 for U.S. Appl. No. 14/567,839, 59 Pages.
Canadian Office Action dated Apr. 7, 2015 for Canadian Patent Application No. 2,722,367, 6 Pages.
Office Action dated May 5, 2015 for U.S. Appl. No. 14/660,549, 25 pages.
Office Action dated Jun. 29, 2015 for U.S. Appl. No. 13/949,983, 39 pages.
Office Action dated Jul. 13, 2015 for U.S. Appl. No. 14/520,274, 69 pages.
Office Action dated Jul. 22, 2015 for U.S. Appl. No. 12/276,120, 120 pages.
Chinese Office Action dated Jun. 30, 2015 for Chinese Patent Application No. 200980117188.5, 7 pages.
Office Action dated Sep. 24, 2015 for U.S. Appl. No. 14/472,012, 40 pgs.
Office Action dated Aug. 19, 2015 for U.S. Appl. No. 12/465,585, 42 pages.
Office Action dated Aug. 20, 2015 for U.S. Appl. No. 14/219,543, 43 pages.
Office Action dated Sep. 11, 2015 for U.S. Appl. No. 14/286,414, 28 pages.
Office Action dated Oct. 30, 2015 for U.S. Appl. No. 13/949,983, 19 pages.
Final Office Action dated Jan. 21, 2016 for U.S. Appl. No. 12/276,120, 108 pages.
Final Office Action dated Jan. 21, 2016 for U.S. Appl. No. 12/465,585, 28 pages.
Office Action dated Feb. 8, 2016 for U.S. Appl. No. 14/219,543, 40 pages.
Office Action dated Mar. 17, 2016 for U.S. Appl. No. 12/484,072, 97 pages.
Office Action dated Apr. 6, 2016 for U.S. Appl. No. 14/455,614, 97 pages.
Office Action dated Feb. 3, 2016 for U.S. Appl. No. 14/472,012, 42 pages.
Office Action dated Apr. 29, 2016 for U.S. Appl. No. 14/831,013, 76 pages.
European Office Action dated May 9, 2016 for European Patent Application No. 09752238.7, 2 pages.
Office Action dated Jun. 29, 2016 for U.S. Appl. No. 12/276,120, 106 pages.
Notice of Allowance dated Jul. 22, 2016 for U.S. Appl. No. 14/472,012, 45 pages.
Notice of Allowance dated Feb. 3, 2016 for U.S. Appl. No. 14/739,859, 73 pages.
Office Action dated Aug. 18, 2016 for U.S. Appl. No. 15/048,971, 67 pages.
Office Action dated Aug. 22, 2016 for U.S. Appl. No. 12/465,585, 8 pages.
Office Action dated Oct. 3, 2016 for U.S. Appl. No. 12/484,072, 40 pages.
Office Action dated Nov. 3, 2016 for U.S. Appl. No. 15/235,099, 33 pages.
Office Action dated Nov. 28, 2016 for U.S. Appl. No. 15/179,970, 80 pages.
Office Action dated Jan. 18, 2017 for U.S. Appl. No. 12/276,120, 104 pages.

(56) References Cited

OTHER PUBLICATIONS

Office Action dated Jan. 23, 2017 for U.S. Appl. No. 12/465,585, 8 pages.
Office Action dated Dec. 23, 2016 for U.S. Appl. No. 15/179,970, 17 pages.
European Office Action dated Feb. 1, 2017 for European Patent Application No. 09752238.7, 5 pages.
Office Action dated Nov. 1, 2012 for U.S. Appl. No. 12/276,058, 59 pages.
Office Action dated Nov. 5, 2012 for U.S. Appl. No. 12/484,072, 52 pages.
Office Action dated Nov. 20, 2012 for U.S. Appl. No. 12/275,878, 28 pages.
Japanese Office Action dated Sep. 13, 2012 for Japanese Patent Application No. 2011-509669, 10 pages.
Canadian Office Action dated Oct. 30, 2012 for Canadian Patent Application No. 2,722,324, 3 pages.
Japanese Office Action dated Sep. 13, 2012 for Japanese Patent Application No. 2011-509675, 4 pages.
Office Action dated Dec. 3, 2012 for U.S. Appl. No. 12/275,416, 33 pages.
Office Action dated Jan. 17, 2013 for U.S. Appl. No. 13/554,710, 42 pages.
Final Office Action dated Feb. 15, 2013 for U.S. Appl. No. 12/579,957.
Office Action dated Feb. 26, 2013 for U.S. Appl. No. 12/276,120, 59 pages.
Chinese Office Action for Chinese Application No. 200980117263.8 dated Feb. 16, 2013, 7 pages.
Chinese Office Action for Chinese Application No. 200980117188.5 dated Jan. 31, 2013, 11 pages.
Final Office Action dated Mar. 14, 2013 for U.S. Appl. No. 12/484,072, 34 pages.
Office Action dated Apr. 23, 2013 for U.S. Appl. No. 12/175,293, 41 pages.
Canadian Office Action dated Mar. 26, 2013 for Canadian Patent Application No. 2,722,324,4 pages.
Office Action dated Jul. 15, 2013 for U.S. Appl. No. 13/554,710, 37 pages.
Office Action dated Aug. 13, 2013 for U.S. Appl. No. 121276,120, 66 pages.
Office Action dated Aug. 12, 2013 for U.S. Appl. No. 12/275,416, 36 pages.
Office Action dated Sep. 9, 2013 for U.S. Appl. No. 12/465,585, 45 pages.
Office Action dated Oct. 2, 2013 for U.S. Appl. No. 12/275,878, 38 pages.
Office Action dated Oct. 3, 2013 for U.S. Appl. No. 13/892,923, 62 pages.
Office Action dated Oct. 22, 2013 for U.S. Appl. No. 13/898,910, 50 pages.
Office Action dated Oct. 3, 2013 for U.S. Appl. No. 13/934,644, 17 pages.
Chinese Office Action dated Oct. 24, 2013 for Chinese Patent Application No. 200980117263.8, 13 pages.
Chinese Office Action dated Oct. 21, 2013 for Chinese Patent Application No. 200980117188.5, 11 pages.
Japanese Office Action dated Oct. 3, 2013 for Japanese Patent Application No. 2011-509669, 15 pages.
Office Action dated Dec. 12, 2013 for U.S. Appl. No. 12/276,120, 78 pages.
Notice of Allowance dated Feb. 13, 2014 for U.S. Appl. No. 12/275,878, 34 pages.
Hasan et al., "Survivable Wireless Access Network Design with Dual-homing Capabilities"; IEEE Global Telecommunications Conference, Nov. 27-Dec. 1, 2006, 5 pgs.
Japanese Office Action dated Jan. 16, 2014 for Japanese Patent Application No. 2013-026198, 8 pages.
Office Action dated Mar. 26, 2014 for U.S. Appl. No. 12/465,585, 44 pages.

Office Action dated Mar. 24, 2014 for U.S. Appl. No. 13/934,644, 50 pages.
Notice of Allowance dated Apr. 4, 2014 for U.S. Appl. No. 14/090,802, 63 pages.
Office Action dated Mar. 24, 2014 for U.S. Appl. No. 13/671,191, 63 pages.
Office Action dated Jun. 9, 2014 for U.S. Appl. No. 12/276,120, 92 Pages.
Office Action dated Jun. 11, 2014 for U.S. Appl. No. 13/675,150, 68 Pages.
Chinese Office Action dated Jun. 19, 2014 for Chinese Patent Application No. 200980117188.5, 5 Pages.
Canadian Office Action dated May 13, 2014 for Canadian Patent Application 2,722,367, 5 Pages.
Office Action dated Jun. 10, 2014 for U.S. Appl. No. 14/253,553, 16 pages.
Office Action dated Sep. 9, 2014 for U.S. Appl. No. 12/276,120, 93 pages.
Office Action dated Nov. 6, 2014 for U.S. Appl. No. 12/465,585, 43 pages.
Chinese Office Action dated Dec. 22, 2014 for Chinese Patent Application No. 200980117188.5, 4 Pages.
Office Action dated Dec. 23, 2014 for U.S. Appl. No. 13/917,153, 90 pages.
Office Action dated Feb. 4, 2015 for U.S. Appl. No. 13/949,983, 90 pages.
European Office Action dated Feb. 2, 2015 for European Patent Application No. 09747521.4, 4 pages.
Office Action dated Feb. 19, 2015 for U.S. Appl. No. 12/276,120, 90 pages.
Office Action dated Mar. 13, 2015 for U.S. Appl. No. 12/465,585, 39 Pages.
Office Action for U.S. Appl. No. 12/276,120 dated May 15, 2017, 172 pages.
Office Action for U.S. Appl. No. 15/364,250 dated Jul. 14, 2017, 71 pages.
Dftioe Action for U.S. Appl. No. 15/159,755 dated May 10, 2017, 88 pages.
Office Action dated Sep. 15, 2017 for U.S. Appl. No. 15/068,937, 101 pages.
Office Action dated Nov. 24, 2017 for U.S. Appl. No. 15/331,428, 107 pages.
Office Action dated Nov. 6, 2017 for U.S. Appl. No. 12/465,585, 16 pages.
Office Action dated Mar. 1, 2018 for U.S. Appl. No. 15/599,457, 75 pages.
Office Action dated Apr. 4, 2018 for U.S. Appl. No. 15/068,937, 29 pages.
Office Action dated May 3, 2018 for U.S. Appl. No. 12/465,585, 21 pages.
Office Action dated Apr. 27, 2018 for U.S. Appl. No. 15/331,428, 61 pages.
Office Action dated Sep. 17, 2018 for U.S. Appl. No. 15/331,428, 57 pages.
Final Office Action received for U.S. Appl. No. 15/331,428 dated Apr. 8, 2019, 49 pages.
First Office Action received for Canadian Patent Application Serial No. 2,722,367 dated Apr. 15, 2013, 4 pages.
Search report received for Chinese Patent Application Serial No. 200980117263.8 dated Feb. 2, 2013, 1 page.
Search report received for Chinese Patent Application Serial No. 200980117263.8 dated Sep. 27, 2013, 1 page.
Communication pursuant to Article 94(3) EPC received for European Patent Application Serial No. 09752238.7 dated Apr. 8, 2015, 5 pages.
Notification of Reasons for Refusal received for Japanese Patent Application Serial No. 2013-026198 dated Aug. 19, 2014, 6 pages (Including English Translation).
Decision to Grant a Patent received for Japanese Patent Application Serial No. 2013-026198 dated Dec. 18, 2014, 6 pages (Including English Translation).

(56) References Cited

OTHER PUBLICATIONS

Decision to Grant a Patent received for Japanese Patent Application Serial No. 2011-509669 dated Aug. 28, 2014, 5 pages (Including English Translation).

Decision of Refusal received for Japanese Patent Application Serial No. 2011-509675 dated Jul. 16, 2013, 2 pages (Including English Translation).

* cited by examiner

ADMINISTRATION OF ACCESS LISTS FOR FEMTOCELL SERVICE

CROSS-REFERENCE TO RELATED APPLICATIONS

This application is a continuation of, and claims the benefit of priority to each of, U.S. patent application Ser. No. 14/219,543, entitled "ADMINISTRATION OF ACCESS LISTS FOR FEMTOCELL SERVICE", and filed on Mar. 19, 2014, which is a continuation of U.S. patent application Ser. No. 12/465,598, entitled "ADMINISTRATION OF ACCESS LISTS FOR FEMTOCELL SERVICE", and filed on May 13, 2009 (now U.S. Pat. No. 8,719,420, issued on May 6, 2014), which claims the benefit of priority to U.S. Provisional Patent Application No. 61/061,082, entitled "FEMTO CELL SERVICE FRAMEWORK", and filed on Jun. 12, 2008, and also claims the benefit of priority to U.S. Provisional Patent Application No. 61/052,813, entitled "MANAGEMENT OF ACCESS TO FEMTO CELL COVERAGE", and filed on May 13, 2008. The entireties of the above-referenced applications are hereby incorporated herein by reference.

TECHNICAL FIELD

The subject specification relates to wireless communications and, more particularly, to a service framework for administration of femtocell coverage and associated subscriber account(s).

BACKGROUND

Femto cells—building-based wireless access points interfaced with a wired broadband network—are generally deployed to improve indoor wireless coverage, and to offload a mobility radio access network (RAN) operated by a wireless service provider. Improved indoor coverage comprises stronger signal and improved reception (e.g., voice or sound), ease of session or call initiation and session or call retention as well. Offloading RAN reduces operational and transport costs for the service provider.

Coverage of a femto cell, or femto access point (AP), is intended to be confined within the bounds of an indoor compound, in order to mitigate interference among mobile stations covered by a macro cell and terminals covered by the femto AP. Additionally, confined coverage can reduce cross-talk among terminals serviced by disparate, neighboring femto cells as well. Femto cells typically operate in licensed portions of the electromagnetic spectrum, and generally offer plug-and-play installation.

Coverage improvements via femtocells also can mitigate customer attrition as long as a favorable subscriber perception regarding voice coverage and other data services with substantive delay sensitivity is attained. In addition, a richer variety of wireless voice and data services can be offered to customers via a femto cell since such service offerings do not rely primarily on the mobility RAN resources. Therefore, a positive, rich customer experience can depend substantially on adequate femto cell service provided by the network operator.

DETAILED DESCRIPTION

Figure 1:
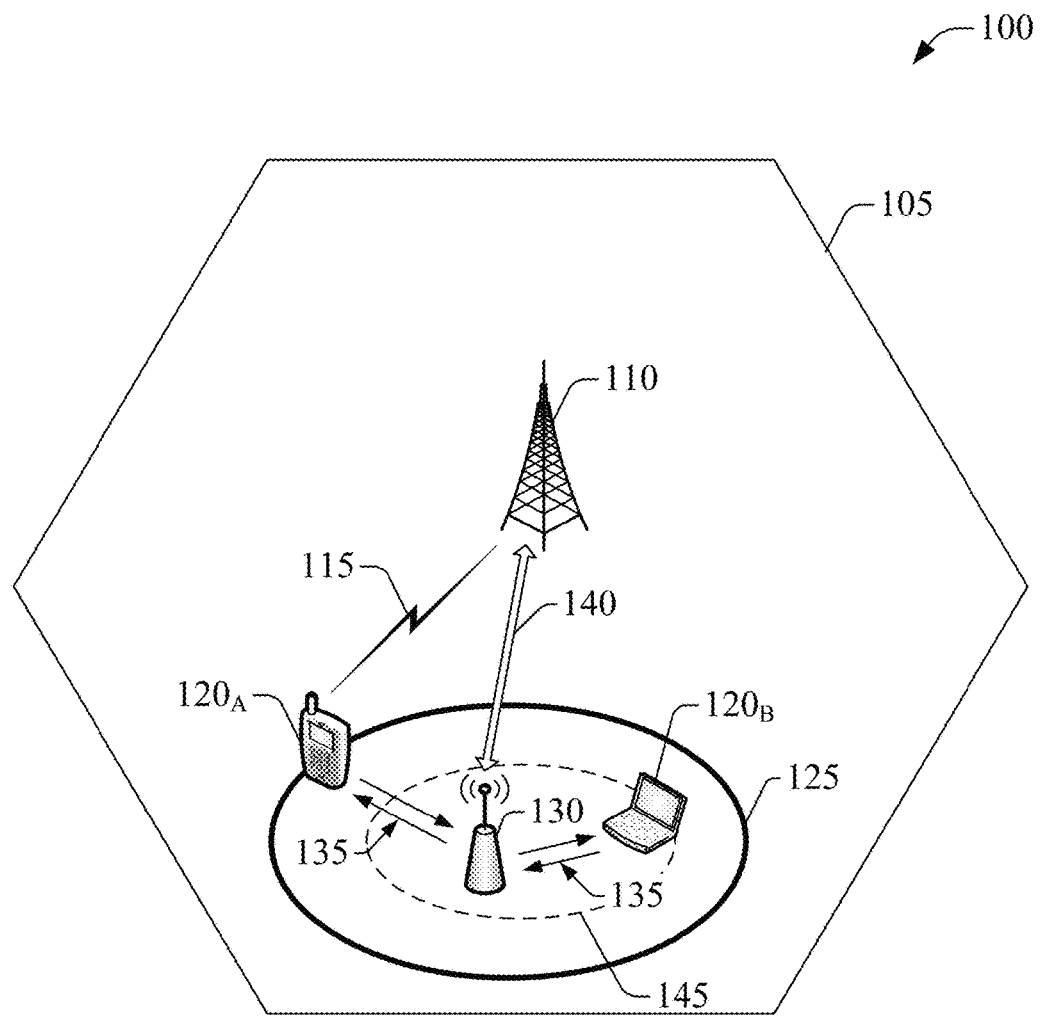
FIG. 1 a schematic deployment of a macrocell and a femtocell for wireless coverage in accordance with aspects described herein.

The subject specification is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "system," "platform," "component," "service," "framework," "interface,"

"driver," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are used interchangeable in the subject application, when context wherein the term is utilized warrants distinction for clarity purposes such distinction is made explicit.

The subject specification provides system(s) and method(s) for a femto cell service framework. In particular, system(s) and method(s) enable femtocell account management service and access thereto. The account management service can be accessed through a broadband network, via a Femtocell Online Account Management (FOAM) interface, and comprises two operational layers deployed within respective demarcation zones. A first layer comprises a web tier that provides landing webpage and a legacy account manager that enables account management for mobility subscribers. A second layer comprises an application layer associated with femtocell service, an application layer for legacy accounts, and a middleware component that provides functional connectivity application layers and backend service component. Account management service allows secure login to femtocell account and redirection amongst femtocell and legacy service components, and enables manipulation of access list(s) that regulate access to femto service. Manipulation of access list(s) comprises addition, deletion, and edition of entries, which comprise unique identifier(s) for mobile devices and related control flags. FOAM interface also allows femtocell account profile creation or management (e.g., update of an access list such as a white list), and registration and activation of femto access points on a service provider network. FOAM interface allows a subscriber to effect or manage such manipulation and generation or update of femtocell account profile(s). A femtocell database retains account profile(s) that comprise access list(s). Access list(s) and updates thereof can be supplied to macrocell network. The femtocell maintains a white list and processes authentication requests (e.g., standard UMTS requests) for allowed devices.

In an aspect of the subject specification, from the residence or small business setting a femtocell connects through the Internet via a digital subscriber line (DSL) or substantially any other backhaul pipe, or cable modem to a femtocell gateway within a service provider network, the femtocell gateway can comprise one or more nodes and can be part of femto network platform. It is noted that the femtocell gateway can perform various functions of a UMTS RNC, and it connects to a service provider core network elements (e.g., MSS/MGW and SGSN) using standard Iu-CS and Iu-PS interfaces, whereas support of IuR, logical connections to disparate femto cell gateways or RNCs can be either avoided or provided based on overhead and necessity considerations. Service provider network manages the femtocell operation through verification of its location within a provider-approved coverage area, assigning a cell identification (ID) and radio frequency channel, and provisioning necessary key parameters.

In yet another aspect, subscribers with Third Generation (3G) capable phones can receive data service subject to appropriate charges, and voice services (e.g., mobile-to-mobile, land-to-mobile, mobile-to-land, push to talk, group conferencing) on the femtocell substantially similar to macrocell service. In addition, subscribers can purchase a feature with a monthly recurring charge (MRC) which provides substantially unlimited voice time units (e.g., minutes) or substantially unlimited data while served through femto cell coverage.

Various example aspects of femto service framework such as point of sales system(s), billing system(s), online account management, femto cell account database for femto profile and account management, customer care and support, and mediation and rating are also provided.

Aspects, features, or advantages of the subject specification can be exploited in substantially any wireless telecommunication, or radio, technology; for example, Wi-Fi, Worldwide Interoperability for Microwave Access (Wi-MAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSUPA), or LTE Advanced. Additionally, substantially all aspects of the subject specification can comprise legacy telecommunication technologies.

It is noted that various aspects, features, or advantages of the subject specification are illustrated in connection with femto access point(s) and associated femto network platform, such aspects or features also can be exploited in indoor-based base stations (e.g., home-based access point(s), enterprise-based access point(s)) that provide wireless coverage through substantially any, or any, disparate telecommunication technologies such as for example Wi-Fi (wireless fidelity) or picocell telecommunication.

Referring to the drawings, FIG. 1 illustrates a schematic wireless environment (e.g., a network) 100 in which a femto cell can exploit various aspects described in the subject specification. In wireless environment 100, area 105 represents a coverage macro cell which is served by base station 110. Macro coverage is generally intended for outdoors locations for servicing mobile wireless devices, like UE $120_A$, and such coverage is achieved via a wireless link 115. In an aspect, UE 120 can be a Third generation partnership project (3GPP) Universal Mobile Telecommunication System (UMTS) mobile phone.

Within macro coverage cell 105, a femto cell 145, served by a femto access point 130, can be deployed. A femto cell typically covers an area 125 that is determined, at least in part, by transmission power allocated to femto AP 130, path loss, shadowing, and so forth. It should be appreciated that in certain deployment scenarios, area 125 can be substantially the same as 145. Coverage area typically is spanned by a coverage radius that ranges from 20 to 100 meters. Confined coverage area 145 is generally associated with an indoor area, or a building, like a residential or small business setting which can span about 5000 sq. ft. Femto AP 130 typically services a few wireless devices (e.g., subscriber station $120_B$) within confined coverage area 145. In an aspect, femto AP 130 can integrate seamlessly with substantially any PS-based and CS-based network; for instance, femto AP 130 can integrate into an existing 3GPP Core via conventional interfaces like Iu-CS, Iu-PS, Gi, Gn. Thus, operation with a 3G device and 3G SIM is straightforward with femto AP 130, and seamless when handoff to macro cell, or vice versa, takes place. It is to be noted that substantially all voice or data active sessions associated with users within femto cell coverage (e.g., area 125) are terminated once the femto AP 130 is shut down; in case of data sessions, data can be recovered at least in part through a buffer associated with a femto gateway at the network. Coverage of a suspended or hotlined subscriber station or associated account can be blocked over the air-interface, or through the RAN. However, if a suspended or hotlined customer who owns femto AP 130 is in Hotline/Suspend status, there is no substantive impact to the customers covered through femto AP 130. In another aspect, femto AP 130 can exploit high-speed downlink packet access in order to accomplish substantive bitrates. In yet another aspect, femto AP 130 has a LAC (location area code) and RAC (routing area code) that is different than the underlying macro network. These LAC and RAC are used to identify subscriber station location for a variety of reasons, most notably to direct incoming voice and data traffic to appropriate paging transmitters.

As a subscriber station, e.g., UE $120_A$, leaves macro coverage (e.g., cell 105) and enters femto coverage (e.g., area 125), as illustrated in environment 100, UE $120_A$ attempts to attach to the femto AP 130 through transmission and reception of attachment signaling, effected via a FL/RL 135; in an aspect, the attachment signaling can comprise a Location Area Update (LAU) and/or Routing Area Update (RAU). Attachment attempts are a part of procedures to ensure mobility, so voice calls and sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, and/or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 120 is allowed on femto cell 125 and incoming voice and data traffic are paged and routed to the subscriber through the femto AP 130. It is to be noted also that data traffic is typically routed through a backhaul broadband wired network backbone 140 (e.g., optical fiber backbone, twisted-pair line, T1/E1 phone line, DSL, or coaxial cable). To this end, femto AP 130 is connected to the broadband backhaul network backbone 140 via a broadband modem (not shown). In an aspect, femto AP 130 can display status indicators for power, active broadband/DSL connection, and gateway connection. In another aspect, no landline is necessary for femto AP 130 operation.

It is to be noted that as a femto AP 130 generally relies on a backhaul network backbone 140 for routing and paging, and for packet communication, substantially any quality of service handles heterogeneous packetized traffic. Namely, packet flows established for wireless devices (like terminals $120_A$ and $120_B$) served by femto AP 130, and for devices served through the backhaul network pipe 140. It is to be noted that to ensure a positive subscriber experience, or perception, it is important for femto AP 130 to maintain a high level of throughput for traffic (e.g., voice and data) utilized on a mobile device for one or more subscribers while in the presence of external, additional packetized, or broadband, traffic associated with applications (web browsing, data transfer (e.g., content upload), and the like) executed in devices within the femto coverage area (e.g., either area 125 or area 145).

Figure 2:
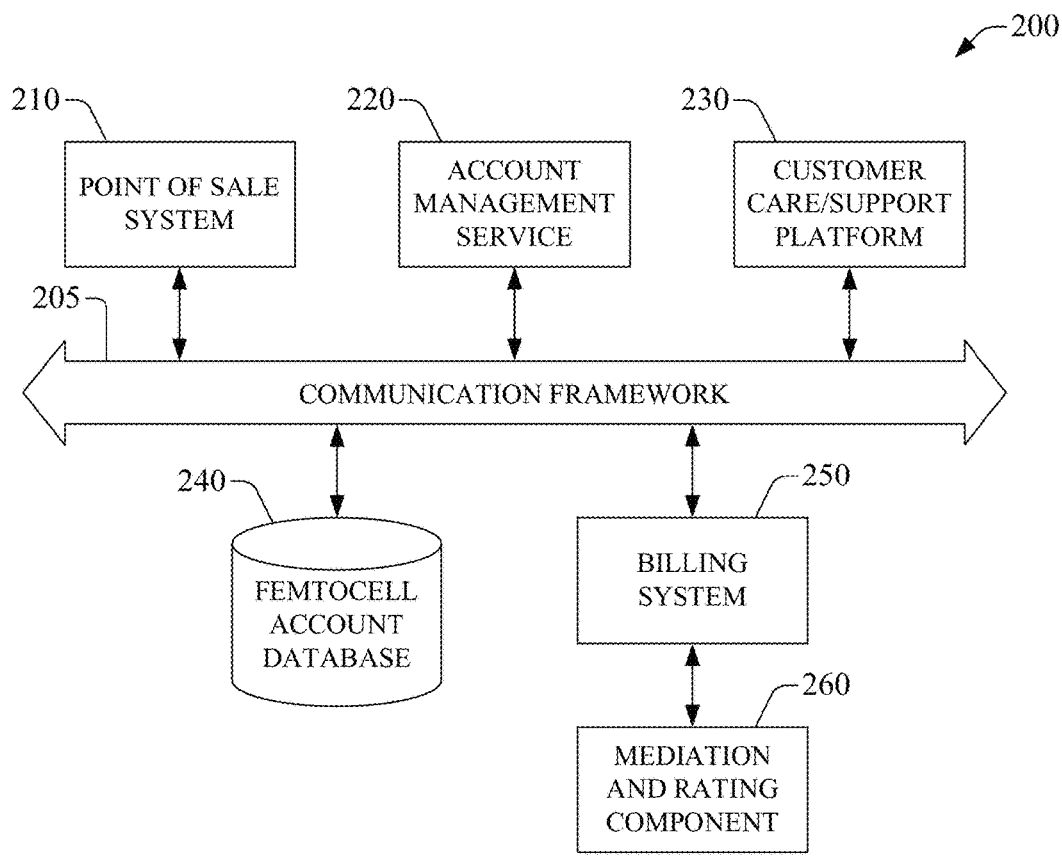
FIG. 2 is a block diagram of an example femto cell service framework in accordance with aspects disclosed herein.

FIG. 2 is a high-level block diagram of an example femto cell service framework 200 in accordance with aspects described in the subject specification. Femto cell system framework 200 comprises a point of sale system 210 which facilitates purchase of femto cell equipment, or femto access point, and returns and exchange as well. In addition, POS 210 facilitates a customer to add femto cell feature plans to customer that have access to a femto AP or are subscribed to wireless communication plan(s) for a service provider, or network operator, that operates femto cell coverage. In addition, POS 200 manages inventory of femto cell access points and associated equipment. Femto customer premise equipment (CPE) purchased through POS 210 and accounts for femto coverage opened via POS 210 can be configured via account management service 220. This service is typically networked, and can be based off a web-based interface.

Various aspect of the subject specification in connection with POS 210 comprise: (i) Femto cell CPE can be purchased by subscriber(s) and non-subscriber(s) of service provider, or network operator. (ii) POS 210 comprise substantially all sales channels that support sales of wireless communication equipment and feature (e.g., Femtocell voice and Femtocell data add-on features), such add-on features can be conveyed through catalogues in various media and mechanisms (e.g., direct mail solicitation, advertisement); even though resellers (e.g., mobile virtual network operators (MVNOs)) may not be encompassed in POS 210. It should be noted that POS 210 can implement limitations based on business and operation consideration that can favor access to add-on features from subscriber(s) with post-paid subscribed service with the network operator. (iii) Furthermore, POS 210 can structure commission schemes for voice, data, and add-on features in a conventional manner, or it can implement customized commission schemes to enhance specific markets and retailers, customer segments, business regions, and so forth. (iv) POS 210 can determine policies that make return and exchange of femtocell equipment, e.g., a femto AP, available in retail stores (e.g., offline locations) rather than via DF or through an online or networked interface. In addition, such policies can regulate warranty execution for femto cell equipment. Return of femto devices can be implemented in a conventional manner, e.g., in accordance with policy for wireless network devices or user equipment, or alternatively in accordance with custom mechanism(s) dictated by business operation(s) (iv) POS 210 can also implement mail-in rebates, which can be provided to customers who purchase femto cell equipment and meet a set of predefined business criteria. (v) It should be appreciated that to avoid complexity at a time of a purchase (or provisioning), no check is conducted to confirm that a customer has access to a 3G handset(s) or 3G SIM(s).

Account management service 220 provides customers with various configuration tools, such as secure login to an online account for registration and activation of femto AP and associated service, management of acquired femto access service (e.g., settings of voice and data, which can comprise video-streaming, music-streaming, IP-based television, online gaming, calendar and other organization tools; add-on features; generation and maintenance of femto access lists (e.g., white lists); parental monitor configuration (e.g., creation of voice and data usage logs) . . . ), validation and access to emergency call service like E911 for provided address(es), validation of service provider licensed coverage for provided address(es), network provisioning, and so on. In an illustrative aspect of the subject specification, address(es) validation can be accomplished through a customized interface to a service provider of geographical location coordinates, or indicators, even though other location services can be utilized, comprising proprietary or custom made services. It should be noted that substantially all user configurable settings can be handled via customer self-care from the femto cell account management service 220, or provisioning site. Moreover, a set of frequently asked questions (FAQs) and customer training can facilitate a customer update his/her address when the femto AP (e.g., femto AP 130) is physically displaced. Activation and update to settings can be notified to a customer via email, IM, SMS, and the like.

Account management service 220 can facilitate femto cell provisioning through a networked interface, e.g., a self-service or self-care web portal, which can further support aspects of femto cell registration, activation and management thereof, which can comprise access list(s), e.g., white list(s), configuration. Femto cell provisioning web portal, or networked interfaced, can support consumer and business customers. In addition, femto cell provisioning networked interface, or web portal, can provide information on the femto cell activation process through a set of frequently asked questions, which can be updated at specific time intervals based upon information collected through customer care/support platform 230, for example. Active subscribers with access to an online management account, for example, or substantially any other web-based or networked interface, can access femto cell provisioning site.

Purchase of equipment and account management can be supported via customer care/support platform 230: Customer care agents that operate through platform 230 can facilitate activation/deactivation of service, configuration of white lists, validation and changes of address, adjustment to rate plans for femto coverage, creation of linked femto accounts, etc. Moreover, customer care/support platform 230 agents can add or remove femto cell voice and femto cell data, and femto cell add-on features to or from a customers' account. Product description, pricing, and availability can be available, e.g., over a networked interface or communication framework 205, to all audiences within customer care/support platform. In addition, troubleshooting support information and escalation procedures can be available to appropriate audiences within customer care/support platform 230 based at least in part upon established work group responsibilities. In an aspect of the subject specification, POS 210 and substantially all channels impacted outside customer care/support platform 230 can leverage off support content available in customer care/support platform 230. In another aspect of the subject specification customer care/support platform 230 agents can input an address, in which the customer intends to use a Femtocell access point, for femto cell spectrum validation, such is a courtesy check that is optional and can be utilized as an instrument to enhance customer experience; such manipulation of femto cell information related to provisioning process for a customer can require a reference to M&Ps to be made In yet another aspect, customer care/support platform 230 can have access to current rebate programs as well as substantially any promotional campaign associated with femto cell coverage. In a further aspect, customer care/support platform 230 agents can instruct a customer who has lost, or misplaced, their unique femto equipment identifier, and thus cannot activate it, to locate the unique identifier in a purchase receipt, equipment box, or on another device; agents are unable to retrieve a unique identifier through femto cell service network. In a further yet aspect, customer care/support platform can have visibility into location status, femto device status indicators, account settings, and capability to shutdown or reboot a femto cell, in order to troubleshoot customer issues. It is noted that femto cell troubleshooting can be managed and/or supported by Data Support/PMC.

Further to example framework 200, femto equipment (e.g., femto AP) and service plans purchases, as well as retention of femto service is managed through billing system 250 in accordance with mediation and rating component

260. Billing system 250 comprises charges administration for voice and data service plans, and add-on feature plans (e.g., on-demand video and music, IP-based television shows, multicast conferencing, etc.). Moreover, billing systems 250 comprises tracking SoC in femto cell equipment for active, registered subscribers.

Various aspects of billing system 250 and mediation and rating component 260 are presented next. (i) Point of origination billing can be implemented to rate the calls based on whether the call originated on macro or femto network. (ii) A customer who has voice, data, and add-on features or SoCs can be rated against the features, otherwise the customer's regular voice or data units (e.g., minutes, Kbs) can be decremented accordingly. (iii) Billing system can comprise a component (not shown) that formats invoice (e.g., bill) presentation so as to display Femtocell billed usage via separate identifiers in accordance with the following illustrative and non-limiting types of usage:

Femtocell Kb data bucket
Femtocell MMS data bucket
Femtocell SMS/IM data bucket
Femtocell Voice bucket Subscriber can access (e.g., view, or download) his/her billed usage for unlimited Femto cell minutes of use (MOU) free of charge. (iv) Femto cell coverage/service can be disconnected by end user or by billing system initiated on subscription cancelation, subscriber suspension, lack of invoice payment, etc. (v) Mediation and rating component can operate in accordance with model based on the assumption that a femtocell site is assigned a unique cell-ID site, e.g., Cell Global Identity (CGI). Thus, within such a model, voice mediation relies on MSC, LAC and cell-ID be defined and this combination be unique. To ensure uniqueness of cell-ID a pseudorandom sequence can be associated to the femto cell site, and cell-ID re-use can be utilized throughout a coverage region. Data mediation (e.g., mediation of GPRS/UMTS packet domain) also relies on the combination of LAC and cell-ID be unique. (vi) Mediation and rating component 260 can utilized femto cell LAC and cell-ID identifiers in MSC CDRs in substantially the same manner as these identifiers are utilized for non-femtocell cell-sites. In addition, mediation and rating component 260 can utilize femto cell LAC and cell-ID identifiers in S-GSN CDRs in substantially the same manner as utilized for non-femtocell cell-sites. Correlation of S-CDR attributes to other data usage CDR(s) is not performed by mediation and rating component 260. In addition, in an aspect of the subject invention, mediation and rating component 260 relies on the network providing LAC in GGSN and CSG EDR(s). It is noted that mediation during a correlation process can extract LAC from GGSN CDF or CSG EDR and comprise it within IM/MMS CDR(s) for rating. (viii) Mediation and rating component 260 can get timely updates of femto cell Cell sites (e.g., through an interface to customer care/support platform 230). (vii) To enable mediation, network(s) that services macrocell and femtocell can recognize whether a call was initiated on the macrocell network or femtocell network.

POS 210 and conjunction with billing system 250 can generate commercial reports related to Femto equipment sales, femto add-on features engaged or contracted. Such customer intelligence (e.g., information associated with a behavior of a consumer) can be stored in femtocell account database 240, or in a dedicated database therein. Such customer intelligence can be complemented with substantially any information available in database 240, and can be exploited for marketing campaign development and business forecasting, among other possible utilization. In addition, customer care/support platform 230 can manage, at least in part, Mobility billing issues that can be identified within billing system 250. A combined billing and support group can manage combined billing customer issues. Generally, IVR can route femto cell subscriber calls to appropriate business (e.g., POS), billings, or consumer care/support systems or platforms for femto cell support.

Substantially all information associated with subscriber(s) plan and configuration thereof can be stored in femtocell account database 240. Additional operation information associated with substantially any component, system, or platform that is a part of femtocell service framework can be stored in database 240. It should be noted that femto cell account database 240 can exploit substantially any mechanism for efficient data storage and manipulation like multi-dimensional data schemes, hierarchical representation, data compression based on parsimonious representations, wavelet compression, distributed database deployment. In the latter case, database 240 comprise various dedicated databases that contain information based in accordance with markets, customer location, customer segments, etc. In an aspect of the subject specification, femto cell account database is identified as a directory database (DD) for femtocell, or femtocell customer directory. DD is a main data repository, or database, for femto account profile(s) for online account management as described herein. Femto account profile(s) attributes can comprise, but are not limited to comprising, operation or activation status, CTN, equipment ID or customer premise equipment (CPE) ID, addresses and associated geographical indicator(s) (e.g., global positioning system (GPS) coordinates (x,y)), device, e.g., femto AP, label or "nickname" which typically can be determined by a subscriber, effective date, expiration date of service, active flag, manual override, cell global identity (CGI), CGI effective date, CGI expiration date. It should be appreciated that (x,y) coordinates of femto cell location addresses obtained through a geographical-indicator service provider, can be stored in a dedicated database within DD. In another aspect, such dedicated database within DD can also store femtocell customer profile(s), access list(s) such as white list(s) or black list(s), or unique equipment identifier(s).

Figure 3:
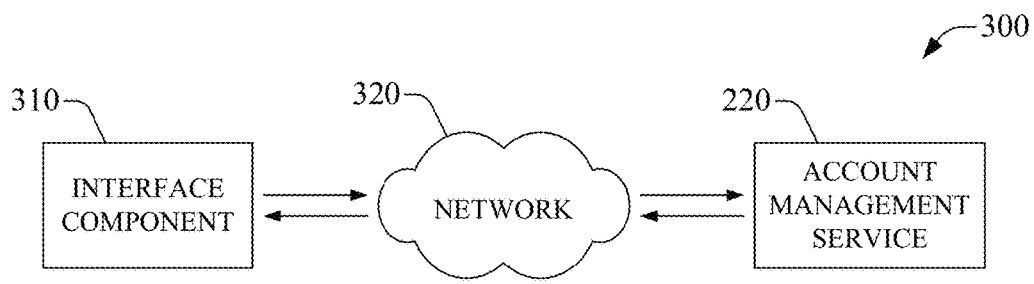
FIG. 3 is a block diagram of an example system that enables femtocell service account management in accordance with aspects described herein.

FIG. 3 is a block diagram of an example system 300 that enables femtocell service account management in accordance with aspects described herein. Management can comprise creation of a femto service account, generation of a femto account profile, and manipulation of access list(s), such as white list(s) or black list(s). Interface component 310 is linked through a network 320 with account management service 330. Network 320 can comprise one or more broadband networks such as a wide area network (WAN), a local area network (LAN), or a backhaul pipe such as backhaul network backbone 140. As an example, broadband network 320 can comprise a non-mobile broadband internet service provider, a local area network such as an enterprise network, or a mobile network platform (e.g., a core network in a cellular telecommunication environment).

Interface component 310 can allow delivery of attribute field values or information such as addresses, customer telephone numbers (CTNs), notification email addresses, add-on feature selection, or the like that can enable, at least in part, configuration or setup of femto account(s) and related femto account profile(s), which can comprise access list(s) such as white list(s) of wireless mobile station numbers approved for coverage through a specific femto access point, e.g., femto AP 130. In addition to configuration of white list(s), interface component 310 can allow configuration of black list(s), which explicitly identify mobile devices that are to be excluded from femto coverage through access point 130 and that upon attachment to femto AP 130 can trigger an exception handling procedure. Moreover, interface component 310 can access a subscriber database (not shown) through network 320, in order to extract identification numbers, codes, tokens, or labels for subscribers/subscriber stations that can be entered in an access list, e.g., a white list.

In an aspect, interface component 310 can be a web-based, online graphic user interface (GUI) such as a conventional web browser that provides access to the internet, e.g., network 320. However, it is noted that other networked interfaces to allow entry of attribute field values to configure access list(s), e.g., white list(s) or black list(s), or femto account profile(s) are possible; for instance, interface(s) commanded through at least one of voice or sound, touch, or biometric registers such as fingerprint pattern, iris pattern, deoxyribonucleic acid (DNA) profile, or the like. In example scenarios, it should be appreciated that biometric-driven interface(s) can be employed in environment(s) wherein addition(s) to white list(s) 343 or black list(s) 341, or white list profile(s) 345 is controlled by authorized personnel with specific clearances to add/remove attribute fields, since communication can be classified.

Access list(s), e.g., white list(s), are an instrument (e.g., a component) for management of access to femtocell coverage through a specific femto AP. An access list, e.g., a white list, can establish access authorization, prioritization and revocation of subscriber(s) or subscriber station(s). As an example, an access list, e.g., a white list, can comprise wireless mobile station numbers approved for coverage through femto access point 130. It is to be noted that substantially any identification token(s), label(s), or code(s) that indentify a subscriber station can be employed. Access list(s) can be stored in the data storage or memory (e.g., in volatile storage) within femto AP 130. Additionally, or alternatively, access list(s) can be stored in disparate (e.g., non-volatile) network components such as a network component (e.g., radio network controller, serving node(s), gateway node(s)) administered by a service operator. In an aspect, access list(s) can be retained within a dedicated femtocell account database 460.

In addition to admission control such as regulation of attachment attempts, access list(s), e.g., white list(s), can be employed for at least one of optimal or nearly-optimal paging, e.g., only IMSI(s) comprised on the access list(s) of a whitelisted AP are paged; assessment of optimal or nearly-optimal reject mechanism, e.g., different reject mechanisms if home AP LAC is same as visited AP LAC; or to control which AP accept incoming handovers.

In a non-limiting example, access list(s), e.g., white list(s), or any set of numbers, codes or tokens thereon, that comprise a set of mobile phones approved for coverage by femto AP 130, can be portable through accounts or billing groups associated with a set of subscribers to a service operator that administers femto AP 130, or a macro network. As an illustration, femtocell voice and femtocell data add-on features can apply to substantially any femtocell in which a subscriber is incorporated into a white list associated with the femtocell. It should be appreciated that, in an aspect of the subject specification, non-subscribers of femto service provider, or network operator, are unable to connect to a femto cell serviced by a femto provider; when a non-subscriber number is added to a white list, the non-subscriber fails to connect to the femtocell. As another illustration, access list(s), e.g., white list(s), can support up to N fields (N a positive integer; e.g., N=50) for unique mobile phone numbers (e.g., a mobile device identifier such as a 10-digit mobile directory number, a Mobile Subscriber Integrated Services Digital Network (MSISDN) number, an international mobile subscriber identity (IMSI) number, an international mobile equipment identity (IMEI), a temporary mobile subscriber identity (TMSI), packet TMSI (P-TMSI), an international mobile equipment identifier (IMEI), a mobile directory number (MDN), a mobile identification number (MIN), a Telecommunications Industry Association (TIA) electronic serial number (ESN), or a multi-bit identification number like the mobile equipment identification (MEID) code), or any suitable identifying codes or tokens. The number N of fields can be determined, or configured, by a service operator based at least in part on technical aspects (like network resources, quality of service (QoS) considerations; macrocell network area of coverage (e.g., MSA/RSA), or the like) and commercial aspects such as promotional considerations, mitigation of customer attrition, gains in market share, etc., and subscriber type, e.g., consumer or enterprise; or aspects of provision of coverage. As an example, N can be subscriber dependent or femto AP dependent. It should be appreciated that, in an aspect of the subject specification, end users are exposed to, and provide, one or more MSISDN(s) for inclusion in access list(s), e.g., 468, such mobile device identifiers are mapped, e.g., via a lookup mechanism, to actual IMSI(s) that one or more network component(s) can exploit. Femto account manager 605 can enable or implement such the lookup mechanism that effects mapping of an MSISDN to an IMSI, or substantially any mapping that renders a mobile device identifier, code or token, provided by a user into a format that can be utilized by one or more network components.

In addition, access list(s), e.g., white list(s) or black list(s), can comprise various degrees of complexity. In an aspect of the subject specification, white list(s) entries can be pre-populated with individual responsibility user (IRU) identifying information; business and consumer account holders information; active and suspended MSISDNs, IMSIs, IMEIs, ESNs, or substantially any other code or token. Deselect option flag(s) or attribute field(s) also can be provided in a pre-populated access list, e.g., a white list. As an example, it is noted that a white list can be associated with disparate white list(s) at the device identifier level, e.g., MSISDN level. Updates to at least one of access list(s), e.g., white list(s) or black list(s), or femto account profile(s) can be notified to a customer via email communication, instant message (IM), short message service (SMS) communication, multimedia message service (MMS) communication, or the like. In an aspect, email account(s) or address(es) for notification can be configured at the time of establishment of a femto account creation and generation of a profile associated with the femto account.

In an aspect of the subject specification, when disparity among femto cell and macro cell billing and cost implication occur, a femto cell subscriber can be informed whether or not coverage, or wireless coverage, is provided through a femto cell. In particular, a whitelisted mobile can be provisioned an updated network indicator display when served through a femto cell. Upon entry in white list(s), network or service provider can convey via SMS, MMS, IM, email, or the like, updated alphanumeric tag requirement(s), or substantially any other requirement(s), to a specific subscriber station. Such requirements can comprise a femto AP identifier and associated alphanumeric network display. After an update, the subscriber station can display the specified indicator while attached, or camped, on the femto AP.

In an aspect of the subject specification, white list profile parameters that control utilization logic of white list(s) content comprise, without being limited to comprising: (i) temporary access, e.g., full access for a specific time interval such as days or hours; (ii) access only within a window of time in a day (voice and data allowed from 9:00 a-6:00 p, or voice allowed after 9:00 p which can facilitate billing schemes already established by an operator/service provider); (iii) access to specific applications such as scheduler, calendar(s), news streaming, authoring tools, gaming, video and music, etc.; and (iv) relative priority of each white list subscriber entry.

Figure 4:
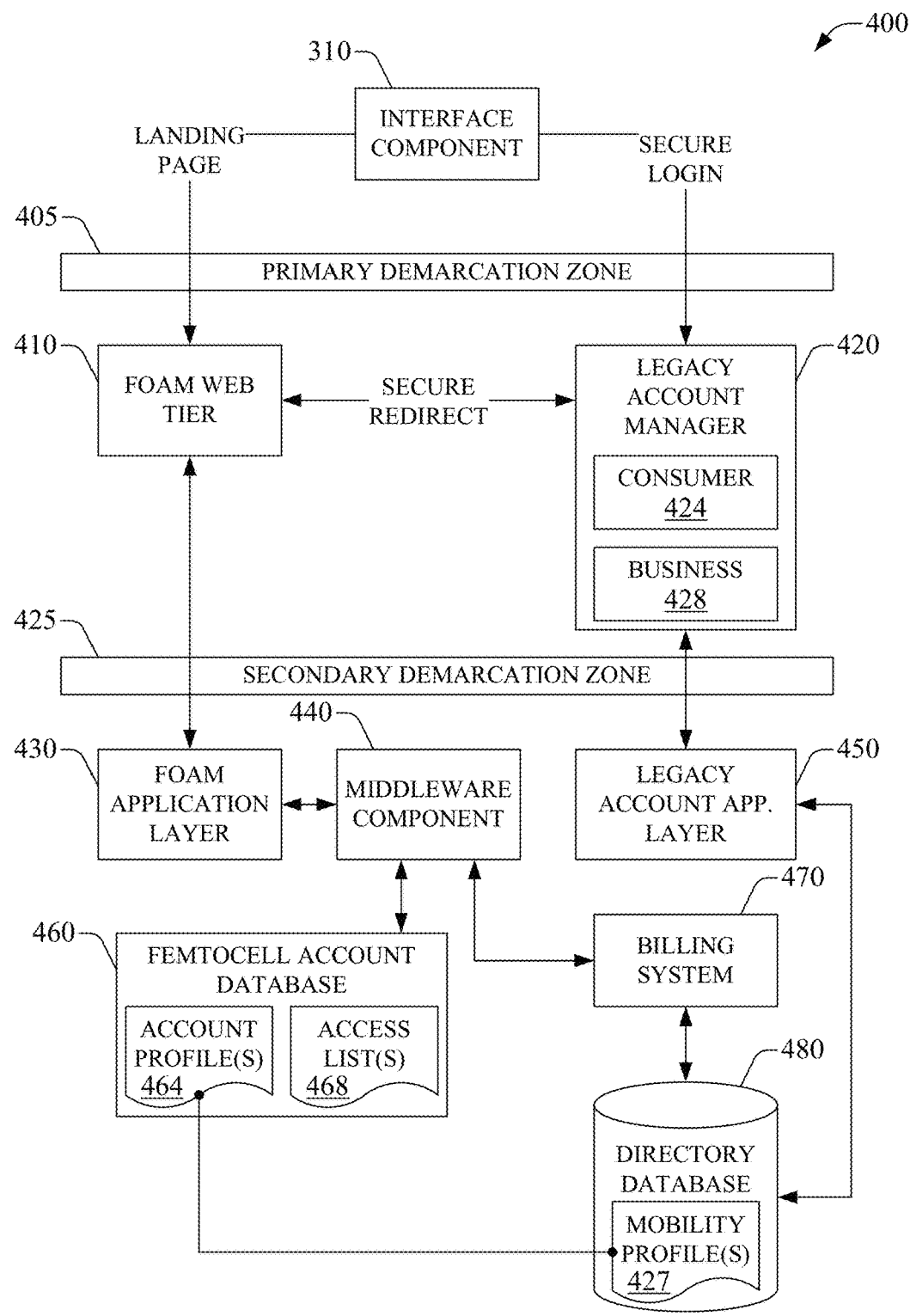
FIG. 4 illustrates an example embodiment of an account management service in accordance with aspects described herein.

FIG. 4 illustrates an example embodiment 400 of account management service 220 in accordance with aspects described herein. Account management service 220 comprises two layers that can be distinguished through two disparate demarcation zones, e.g., a primary demarcation zone 405 and a secondary demarcation zone 425. The primary demarcation zone 405 comprises a femto online account management (FOAM) web tier 410 and a legacy account manager component 420, also termed herein legacy account manager 420, that enables account management for conventional consumer or business accounts; in an aspect, a consumer manager component 424, also termed herein consumer manager 424, enables management of consumer accounts, whereas a business manager component 428, also termed herein business manager component 428, allows management of business accounts. FOAM web tier 410 can comprise a web site through which femtocell customers can create account profile(s) for acquired equipment, register and activate femto AP(s) on the service provider network, and manage access list(s), e.g., white list(s), and addresses. In an aspect, legacy account manager 420 receives signaling for secure login from an interface component 310. Upon successful login, legacy account manager 420 securely redirects a session to FOAM web tier 410 and a landing webpage hosted therein. Such secure session can enable creation of a femtocell account profile, e.g., 464, which can be retained in femtocell account database 460. For extant femtocell account profile(s), upon successful login, legacy account manager 420 can secure redirect a session to FOAM web tier for femtocell account profile management.

Secondary demarcation zone 425 can comprise a FOAM application layer 430 that interfaces with FOAM web tier 410 and internal information technology back office systems of the service provider. In order to access internal services, secondary demarcation zone comprises middleware component 440 that can extract information for billing system 470, femtocell account database 460, and directory database 480. In addition, secondary demarcation zone 425 also can comprise legacy account application layer 450 that can access directory database 480 and provides at least part of the functionality to legacy account manager 420.

In an aspect, FOAM application layer 430 and middleware component 440 can manage workflow for femtocell coverage validation and network registration, validation and activation of emergency services such as enhanced E911, and management of access list(s), e.g., white list(s). In an aspect, a femtocell subscriber who activated a femto AP (e.g., femto AP 130) is allowed to manage access list(s), or white list(s), of the femto AP within his/her femtocell account profile, which can be created through account management service 220. In another aspect of the subject specification, access list(s), e.g., white list(s), owners based on configured privileges associated with subscriber femtocell account profile can view which subscriber is actively registered on their femto cell. For instance, an administrator subscriber can manage femtocell service within an enterprise femto network, which can serve a set of corporate responsibility users (CRUs); the administrator subscriber can monitor registration or inclusion to a set of femto APs that are part of an enterprise femto network.

Femto account profile(s) 464, also termed herein account profile(s) 464, that can be created through account management service 220 can be retained in femtocell account database 460. In an aspect, femtocell account profile(s) 464 can be linked, or associated, with subscriber mobility profile(s) 484, also referred to herein as mobility profile(s) 484, that is retained within directory database 480, which can comprise subscribed information for mobility service provided through a macrocell network. Mobility profile(s) 427 can be associated with consumer profile(s) or business profile(s).

Figure 5:
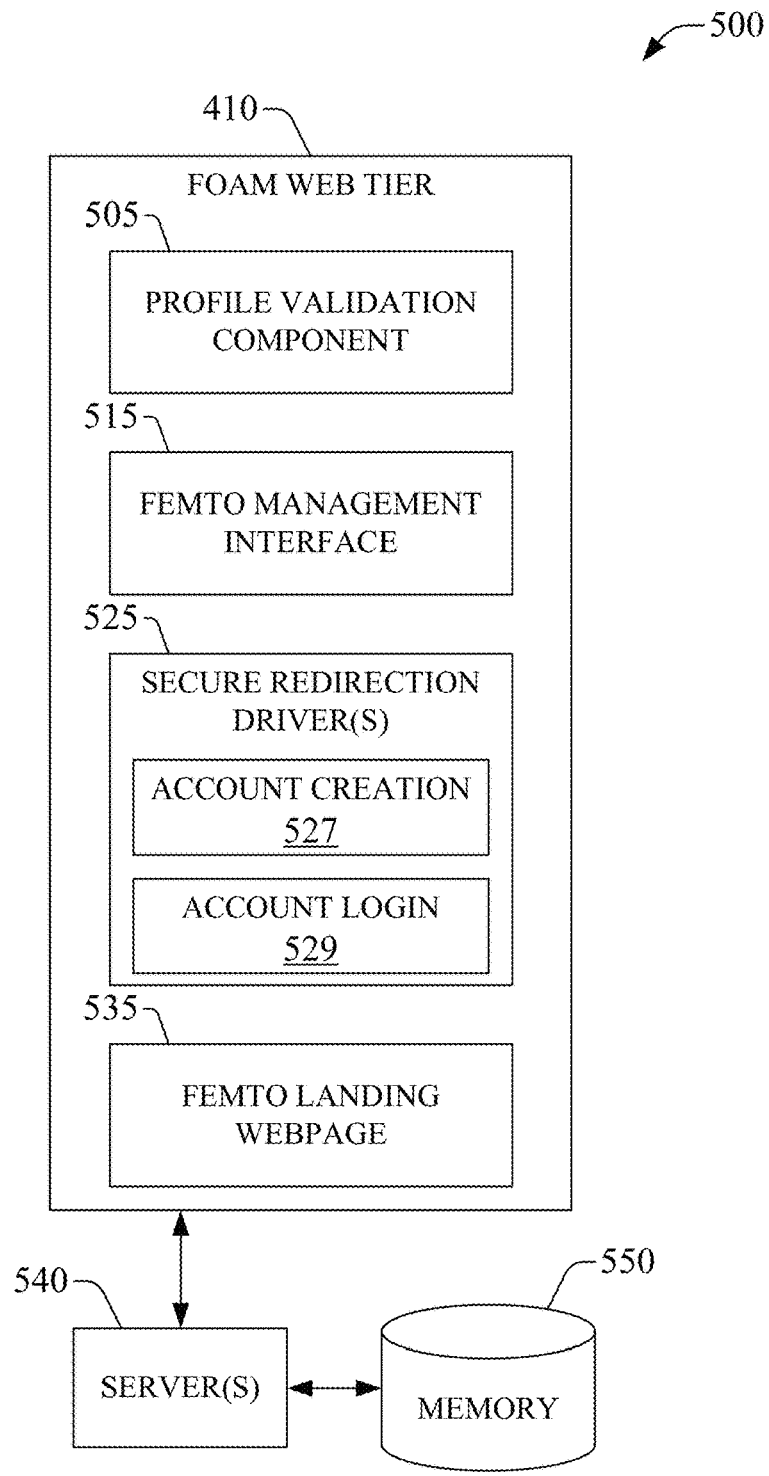
FIG. 5 is a block diagram of an example embodiment of a FOAM web tier in accordance with aspects described herein.

FIG. 5 is a block diagram of an example embodiment of a FOAM web tier 410 in accordance with aspects described herein. Femto landing webpage 535 can be accessed from various web locations such as service provider or network operator website; business partner website(s) such as web portal in which femtocell service or other mobility services are advertised by the network operator; or contractor website(s). Femto landing webpage can offer web links to educational material related to femtocell services and components of the femtocell solution. In addition, femto landing webpage 535 can direct an existing customer or prospective customer to purchase equipment, e.g., femto AP(s), and accessories thereof related to femtocell solution. Moreover, femto landing webpage 535 can allow existing subscribers or femtocell service or conventional mobility service(s) to identify themselves as part of access to femtocell account management service; identification of a subscriber conveys the relationship of the subscriber with the service provider, such as a consumer subscriber or a business subscriber.

Femto management interface 515 exposes a subscriber to various webpages selected through femto landing webpage 535 upon successful login. In addition, femto management interface 515 enables services provided through the various webpages, e.g., purchase, educational resources, troubleshooting, or the like. Femto management interface 515 also delivers and receives signaling and traffic to and from FOAM application layer 430, and components therein, as well as legacy account manager 420. Secure redirection driver(s) 525 can receive signaling from femto landing webpage 535. Account creation driver 527 enables secure redirection to legacy account manager 420 for at least one of consumer account, e.g., consumer service, or business account, e.g., business service.

Profile validation component 505 can query a billing system or directory database to determine an account type based at least in part on a received CTN or other identification provided by a subscriber. Profile validation component can signal account type to legacy account manager 420 to implement subscriber identity management. Queries can be enabled, at least in part through middleware component 440. In addition, profile validation component 505 can signal extraction of account profiles for specific EIDs, such extraction also can be accomplished, at least in part, through middleware component 440.

Server(s) 540 comprise at least one of a processor, a memory, and a bus architecture, and can be functionally connected to each component in FOAM web tier 410. Server(s) 540 can confer, at least in part, the described functionality of component(s), interface(s) and driver(s), and component(s) or functional element(s) therein, within FOAM web tier 410. Server(s) 540 can functionally connect to each of the component(s), interface(s), or driver(s) within FOAM web tier 410 through a bus (not shown) for data or any other information exchange; such a bus can be embodied in at least one of a memory bus, a system bus, an address bus, or one or more reference link(s) or interface(s). Additionally or alternatively, server(s) 540 can execute one or more of the component(s), interface(s), or driver(s) comprised within FOAM web tier 410. Moreover, or as another alternative, one or more components, interface(s), or driver(s) that comprise FOAM web tier 410 can reside within server(s) 540. Server(s) 540 can execute, e.g., through the at least one processor therein, code instructions such as software or firmware application(s), stored in a memory, e.g., memory 550, to provide at least part the functionality of one or more of the component(s), interface(s), or driver(s) that reside within FOAM web tier 410.

Figure 6:
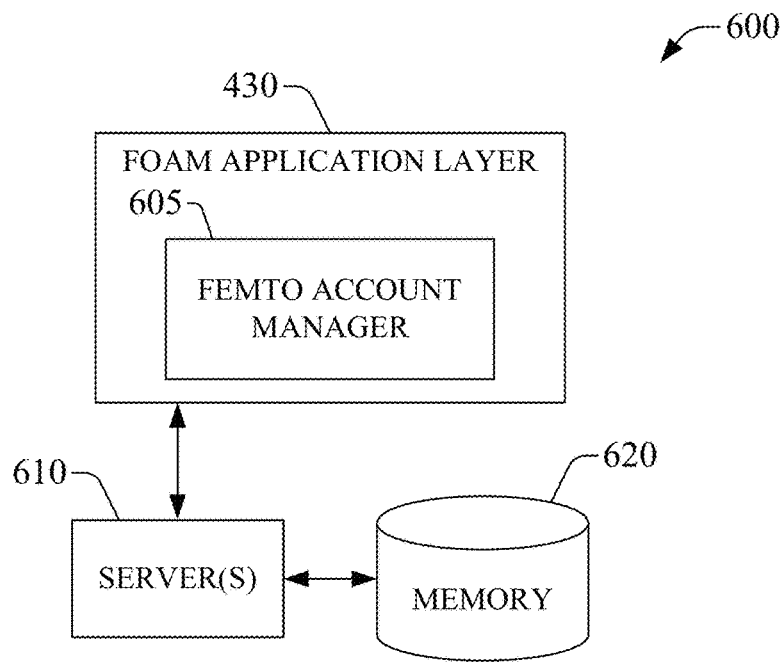
FIG. 6 is a block diagram of an example embodiment of a FOAM application layer that can be part of an account management service in accordance with aspects described herein.

FIG. 6 is a block diagram of an example embodiment 600 of a FOAM application layer 430 in accordance with aspects described herein. Femto account manager component 605, also termed herein as femto account manager 605, can create, at least in part, femtocell service account profile(s) and populate initial access list(s), e.g., a white list, with a CTN linked to the owner of the equipment for which the profile is created. In addition, femto account manager 605, through middleware component 440, can enable at least in part management of femto account profiles and access list(s) through creation, deletion, or revision of records associated with existing femto account profiles, and related access list(s), in femtocell account database 460. Creation of records, or changes thereto, can be based at least in part on information received through femto management interface 515. In addition, femto account manager 605 can extract and convey femto account profiles, and access list(s) therein, for specific EIDs.

Server(s) 610 comprise at least one of a processor, a memory, and a bus architecture, and can be functionally connected to each component in FOAM application layer 430. Server(s) 610 can confer, at least in part, the described functionality of component(s) within FOAM application layer. Server(s) 610 can functionally connect to each of the component(s) within FOAM application layer 430 through a bus (not shown) for data or any other information exchange; such a bus can be embodied in at least one of a memory bus, a system bus, an address bus, or one or more reference link(s) or interface(s). Additionally or alternatively, server(s) 610 can execute one or more of the component(s) within FOAM application layer 430. Moreover, or as another alternative, one or more components that comprise FOAM application layer 430 can reside within server(s) 610. Server(s) 610 can execute, e.g., through the at least one processor therein, code instructions such as software or firmware application(s), stored in a memory, e.g., memory 620, to provide at least part the functionality of one or more of the component(s), interface(s), or driver(s) that reside within FOAM application layer 430.

Figure 7:
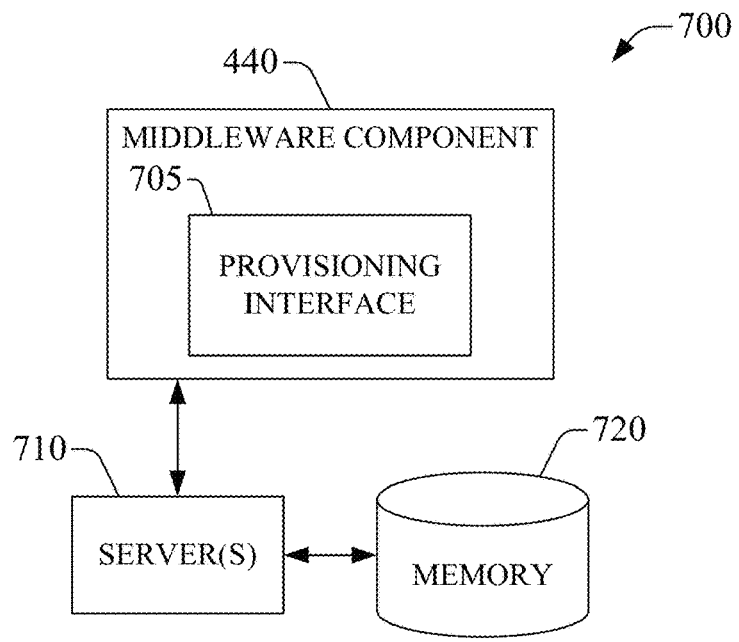
FIG. 7 is a block diagram of an example embodiment of a middleware component that can be part of an account management service in accordance with aspects described herein.

FIG. 7 is a block diagram of an example embodiment 700 of middleware component 440 in accordance with aspects described herein. Middleware component 440 can comprise a provisioning interface 705 that can access information retained in at least one of directory database 480, femtocell account database 460, billing system 470, or customer care/support platform 230. Middleware component 440 also can deliver access information to other application layers such as FOAM application layer 430. In addition, middleware component 440, through provisioning interface 705, can provision updated access list(s) for a specific account profile related to a CPE with EID. Moreover, middleware component 440 can associate mobile station identifiers in an access list, e.g., a white list, with respective ICCIDs. Furthermore, middleware component 440 can enable verification of mobile device identifiers entered in an access list by querying at least one of femtocell account database 460 or directory database 480. Middleware component 440 also can signal outcome of a verification, e.g., it can convey an error signal, e.g., unstructured supplementary service data (USSD) code, or message or supply one or more bits that indicate PASS or FAIL for a verification.

Server(s) 710 comprise at least one of a processor, a memory, and a bus architecture, and can be functionally connected to each interface or functional element within middleware component 440. Server(s) 710 can confer, at least in part, the described functionality of interface(s) within middleware component 440. Server(s) 710 can functionally connect to each of the interface(s) within middleware component 440 through a bus (not shown) for exchange of data or any other information; such a bus can be embodied in at least one of a memory bus, a system bus, an address bus, or one or more reference link(s) or interface(s). Additionally or alternatively, server(s) 710 can execute one or more of the interfaces within middleware component 440. Moreover, or as another alternative, one or more interfaces that comprise middleware component 440 can reside within server(s) 710. Server(s) 710 can execute, e.g., through the at least one processor therein, code instructions such as software or firmware application(s), stored in a memory, e.g., memory 720, to provide at least part the functionality of one or more of the interface(s) that reside within middleware component 440. It is noted that in one or more embodiments, server(s) 710 and server(s) 610 can be the same entity. Likewise, memory 720 can be at least a portion of memory 620, or vice versa.

Figure 8:
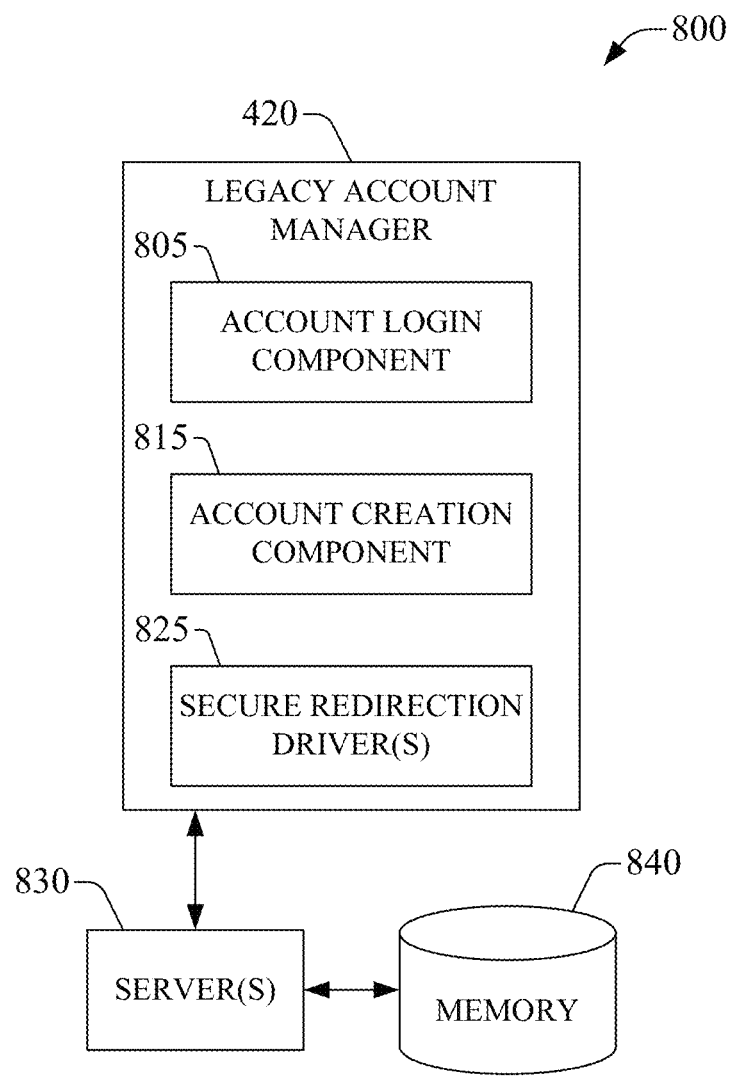
FIG. 8 illustrates a block diagram of an example embodiment of a legacy account manager component in accordance with aspects described herein.
Figure 9:
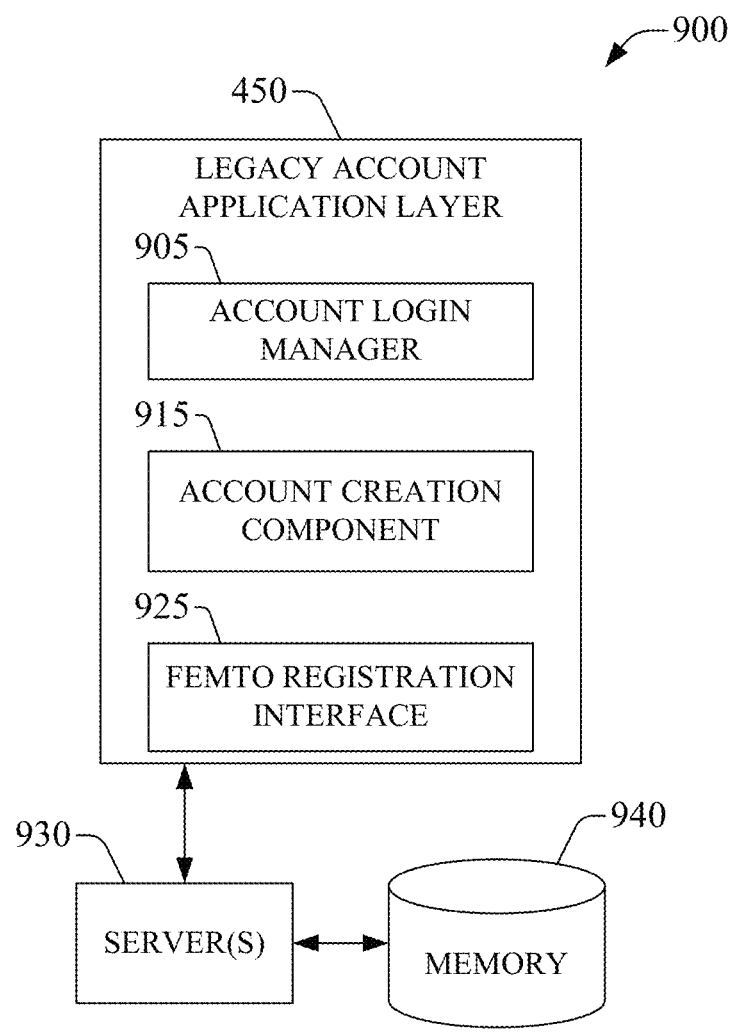
FIG. 9 is a block diagram of an example embodiment for a legacy account application layer in accordance with aspects described herein.

FIG. 8 illustrates a block diagram of an example embodiment 800 of a legacy account manager 420 in accordance with aspects described herein. Account login component 805 can receive signaling from FOAM web tier 410 that indicates a login request to a subscriber account; received signaling can convey whether a login is for a consumer account or a business account. Account login component 805 can direct request to login to a component within legacy account application layer 450. In an example embodiment 900, illustrated in FIG. 9, account login manager component 905 can implement a single sign-on or login based at least in part on subscriber identity credentials retained in directory database 480. Upon successful login to a consumer or business account, secure redirection driver(s) 825 can direct logged on access to FOAM web tier 410. In an aspect, secure redirection can expose femto registration interface 925 that can enable creation of a femto account profile for specific CPE, e.g., one or more femto APs. It is noted that such creation of a femto account profile can comprise manipulation of existing access list(s).

In example embodiment 800, legacy account manager 420 also can comprise account creation component 815 for either a consumer or business subscriber. Account creation component 815 can enable establishment of femtocell service features such as voice, data, or add-ons which can comprise location-based services, automatic customization of access list(s), parental controls, tracking of attachment attempts to a registered AP by mobile devices within range, and so forth. In an aspect, account creation component 815 can exploit account creation component 915 within legacy account application layer 450. Account creation component 915 within legacy account application layer 450 can create requested femtocell service features within billing system 470 or directory database 480.

Server(s) 830 comprise at least one of a processor, a memory, and a bus architecture, and can be functionally connected to each component, driver, or functional element within legacy account manager 420. Server(s) 830 can confer, at least in part, the described functionality of component(s) or driver(s) within legacy account manager 420. Server(s) 830 can functionally connect to each of the component(s) or driver(s) within legacy account manager 420 through a bus (not shown) for exchange of data or any other information; such a bus can be embodied in at least one of a memory bus, a system bus, an address bus, or one or more reference link(s) or interface(s). Additionally or alternatively, server(s) 830 can execute one or more of the component(s) or driver(s) within legacy account manager 420. Moreover, or as another alternative, one or more components or drivers that comprise legacy account manager 420 can reside within server(s) 830. Server(s) 830 can execute, e.g., through the at least one processor therein, code instructions such as software or firmware application(s), stored in a memory, e.g., memory 840, to provide at least part the functionality of one or more of the interface(s) that reside within legacy account manager 420.

With respect to legacy account application layer 450, server(s) 930 functionally coupled thereto can comprise at least one of a processor, a memory, and a bus architecture, and can be functionally connected to each component, interface, or functional element within legacy account application layer manager 450. Server(s) 930 can confer, at least in part, the described functionality of component(s) or interface(s) within legacy account application layer 450. Server(s) 930 can functionally connect to each of the component(s) or interface(s) within legacy account application layer 450 through a bus (not shown) for exchange of data or any other information; such a bus can be embodied in at least one of a memory bus, a system bus, an address bus, or one or more reference link(s) or interface(s). Additionally or alternatively, server(s) 930 can execute one or more of the component(s) or driver(s) within legacy account application layer 450. Moreover, or as another alternative, one or more components or interfaces that comprise legacy account application layer 450 can reside within server(s) 930. Server(s) 930 can execute, e.g., through the at least one processor therein, code instructions such as software or firmware application(s), stored in a memory, e.g., memory 940, to provide at least part the functionality of one or more components or interfaces that reside within legacy account application layer 450.

Figure 10A:
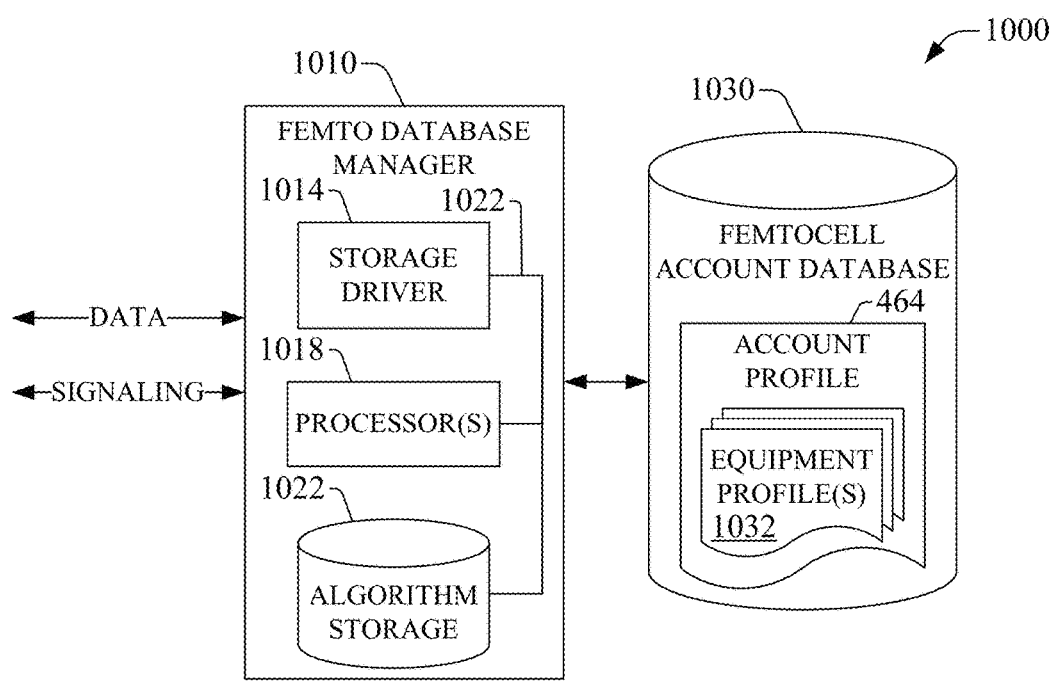
FIGS. 10A and 10B illustrate, respectively, an example femtocell account database and associated database manager component and an example equipment profile that can be comprised in a set of equipment profiles within a femto account profile associated with a femto account linked to a subscriber CTN in accordance with aspects described herein.

FIG. 10A is a block diagram of an example femtocell account database and associated database manager component in accordance with aspects described herein. Femto database manager component 1010 also is referred to herein as femto database manager 1010. Storage driver component 1014, also referred herein to as storage driver 1014, can implement storage functionality to maintain consumer or business subscriber account profile association with femtocell equipment, or customer premise equipment (CPE). Association of femtocell equipment and subscriber account profile for directory database for mobility customers, either consumer or business customers, can be based at least in part on the CTN of the subscriber that acquires femtocell equipment and associated femtocell service. In addition, for each femtocell device, e.g., femto AP, storage driver 1014 can implement storage of authorized "white list" mobile numbers allowed to utilize the femtocell device, or received femto service there from, when in range of the femtocell device, or femto AP; the range typically dictated by the radiating power of the femto AP.

Moreover, for each CPE, or femto AP, storage driver 1014 can retain applicable addresses up to a total of Q addresses, wherein one address is an active, current address, and and Q−1 addresses are historical; Q is a positive integer, e.g., Q=5. Furthermore, storage driver 1014 can maintain pre-population of unique equipment identification (EID), e.g., serial number(s) of femto AP(s), supplied by the network. Further yet, storage driver 1014 can exploit algorithms to effect periodic, e.g., daily, weekly, or monthly, reconciliation processes for billing purposes. In addition, storage driver 1014 can implement reconciliation process(es) based at least in part on predetermined events.

Figure 10B:
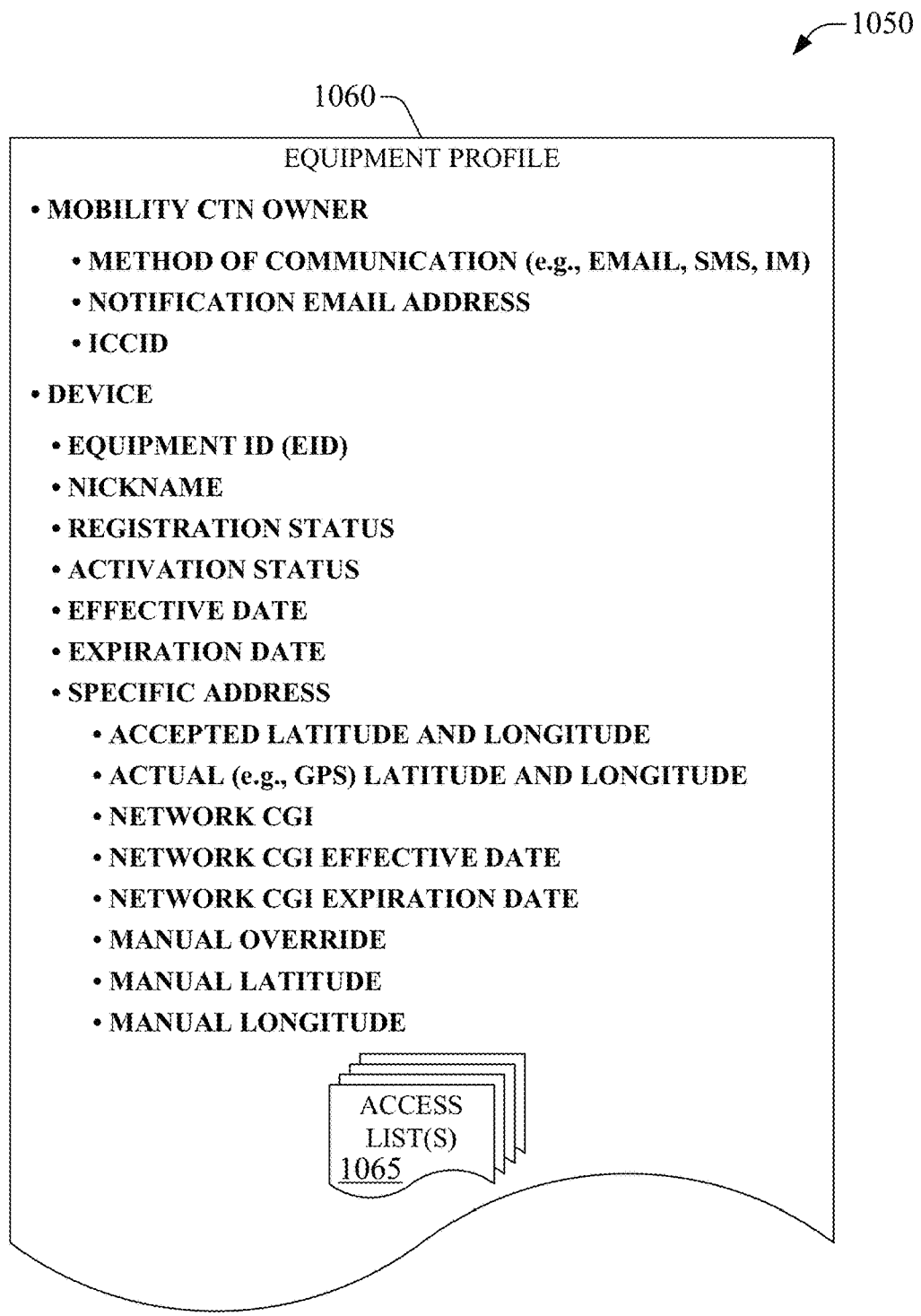

FIG. 10B is an example diagram 1050 of an example equipment profile that can be comprised in a set of equipment profiles within a femto account profile associated with a femto account linked to a subscriber CTN in accordance with aspects described herein. A customer, as identified through a CTN, can have several equipment profiles assigned under a single CTN account. In an aspect, a single customer can have a set of femto APs deployed within a residence in order to provide wireless coverage with various areas within the home. Alternatively or additionally, a business customer can be have a set of femto APs deployed within an enterprise, e.g., a hotel, a supermarket, a factory, a hospital, or the like. Equipment profile 1060 can be linked to at least one of a mobility CTN owner or a single piece of equipment or femto AP ID, and can comprise the following sub-attributes: (A) Mobility CTN owner. (1) Method of communication, e.g., email, SMS, IM, . . . ). (2) Notification email address. In an aspect, the femto notification email address is provided by an IRU or a corporate responsibility user (CRU), and can be supplied at the time of creating a femto account as part of purchase, provisioning, or registration of an access point. (3) ICCID. (B) Device. (i) Equipment ID (EID) assigned to the profile; for example, the EID can be a serial number (SN) of a femto AP. (ii) Nickname of the device. (iii) Registration status. (iv) Activation status. Activation status can comprise the following "Active," "Registered," or "None." In an aspect, activation status is an activation transaction from the network, through a network provisioning component to middleware component to update activation status within femtocell account database 460, or within a local account database. (v) Effective date. (vi) Expiration date. (vii) Specific address for the location of equipment, e.g., the femto AP, which can comprise the following. (a) Accepted latitude and longitude. (b) Actual, e.g., GPS, latitude and longitude. (c) Network CGI (cell global identity). (d) Network CGI effective date. (e) Network CGI expiration date. (f) Manual Override. (g) Manual latitude. (h) Manual longitude. (9) A set of one or more access lists and respective white list numbers or black list number.

Figure 11:
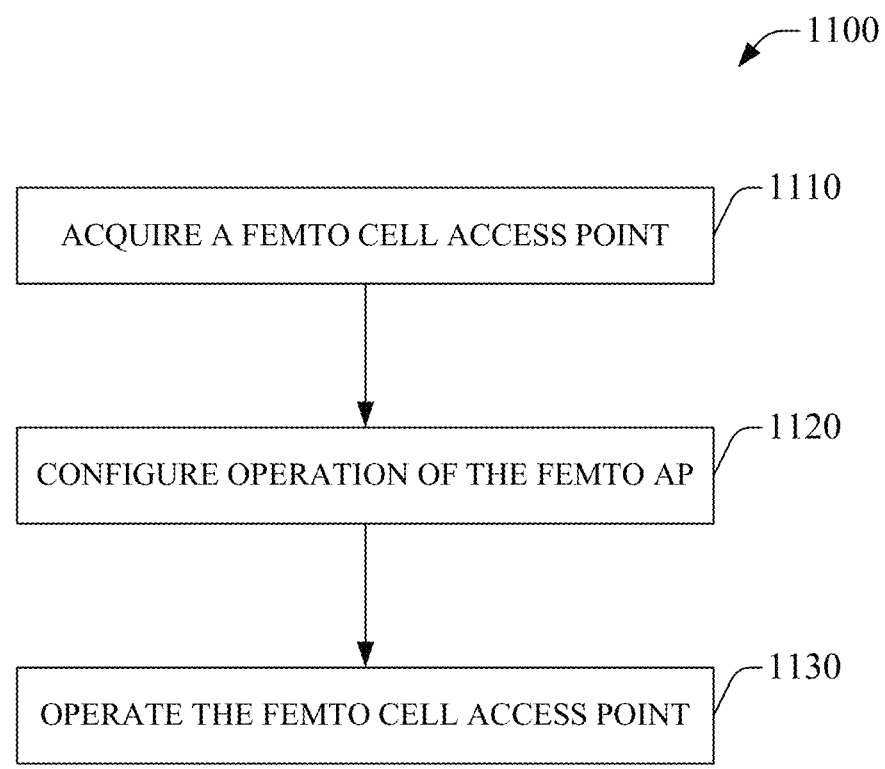
FIG. 11 presents a flowchart of an example methodology for supplying femtocell service according to aspects of the disclosed subject matter.
Figure 13A:
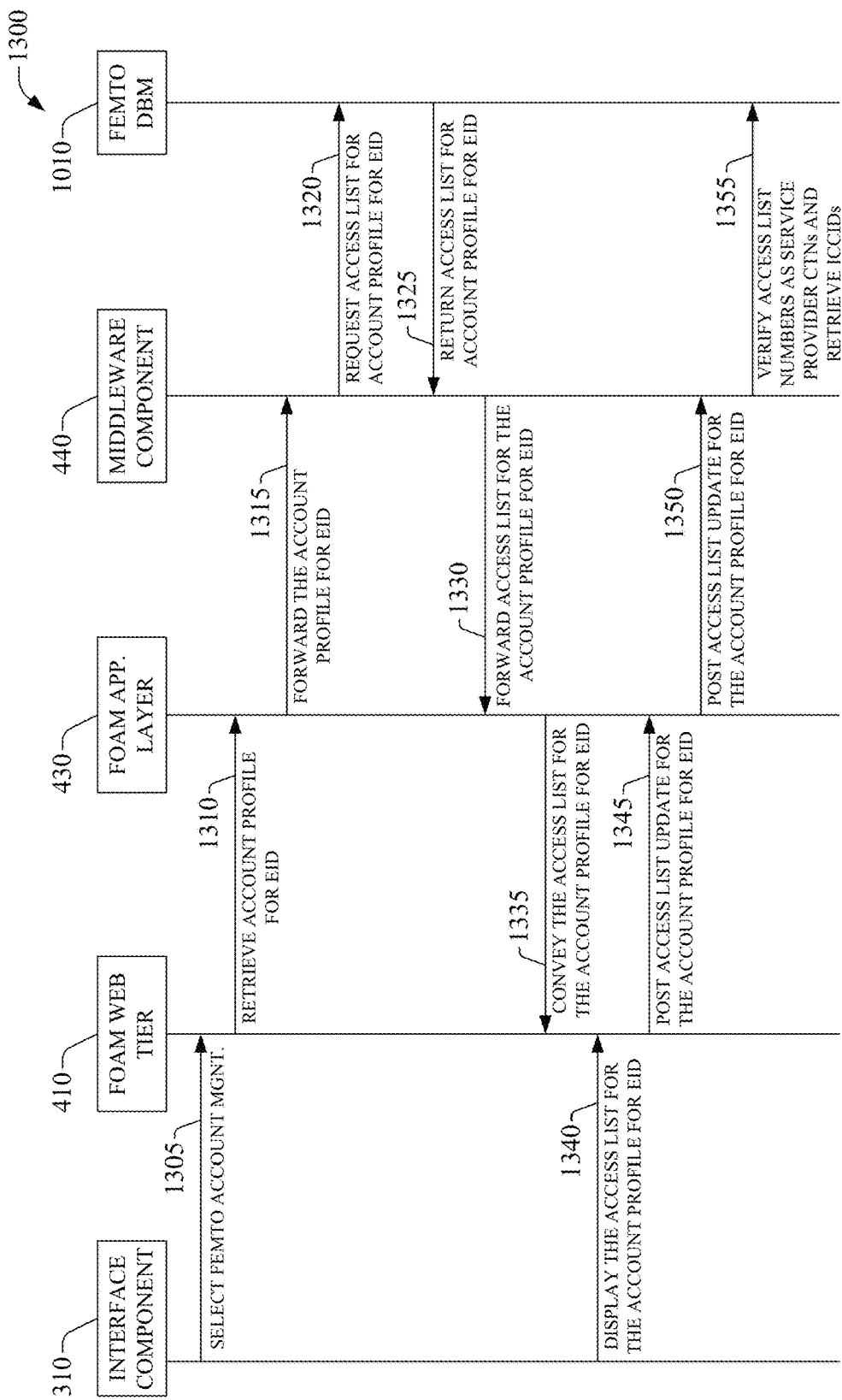
FIGS. 13A-13B illustrate an example interaction diagram or call flow for managing an access list according to aspects of the subject specification.
Figure 13B:
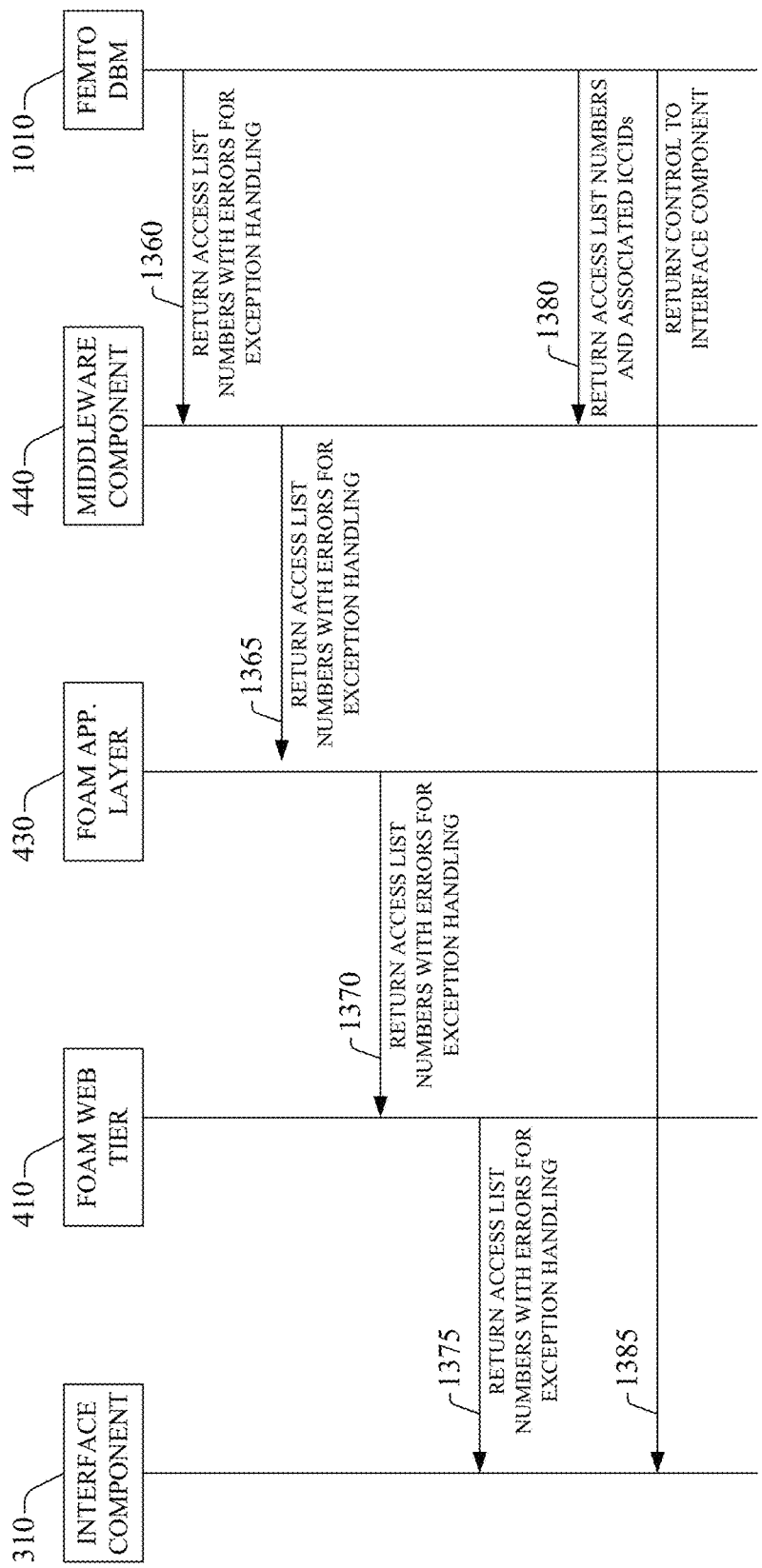
Figure 14:
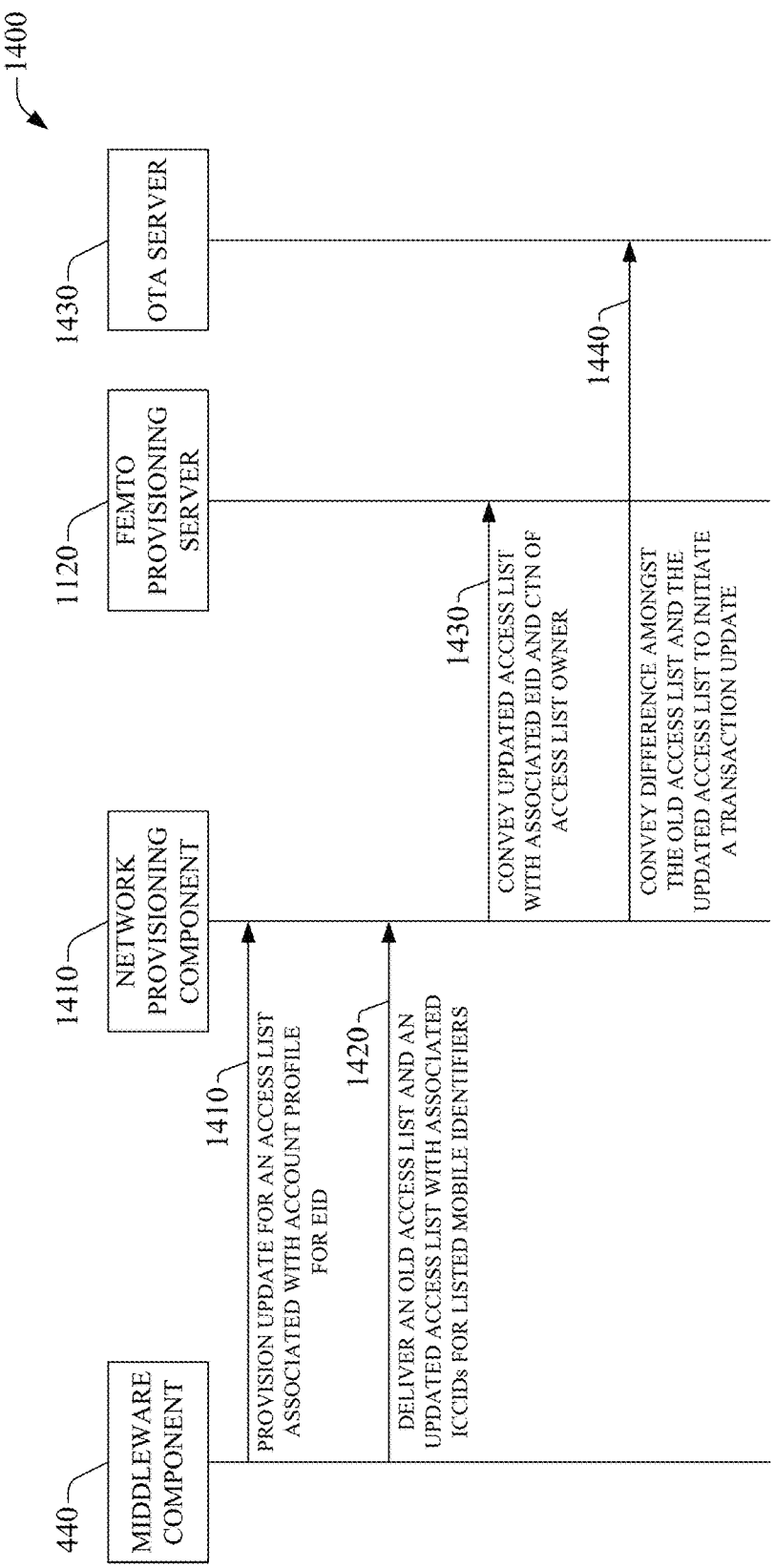
FIG. 14 illustrates an example interaction diagram for supplying access list(s) to a femtocell network component and a macrocell network component according to aspects described herein.

In view of the example systems described above, example methods that can be implemented in accordance with the disclosed subject matter can be better appreciated with reference to flowchart in FIG. 11 and interaction diagrams, or call flows, in FIGS. 12-14. For purposes of simplicity of explanation example methods disclosed herein are presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such example methods to computers or other devices with processing capabilities for execution, and thus implementation, by a processor or for storage in a memory within the computers or devices.

FIG. 11 presents a flowchart of an example method 1100 for servicing a femto cell access point. At act 1110 a femto cell access point is acquired. In an aspect, acquisition is conducted through a point of sales system (e.g., system 210), which can be deployed in a networked configuration (e.g., deployed over the internet). Additionally, POS can comprise substantially all systems necessary to facilitate acquisition and manage post-sale events such as inventory update, service provision, service availability checks, and so on. Is should be appreciated that acquisition of the femto AP can comprise purchase of voice and data plans, comprising add-on features such music and video on-demand, subscriptions to internet protocol television (IPTV), and so forth, from a service provider, or network operator. At act 1120, the femto AP is configured. Configuration can be effected through a networked interface, e.g., an online platform, that facilitates location validation and access to emergency services coverage, generation and management of access profile(s) for specific subscribers that can access service through the femto AP, service account registration and preference setup, and service provisioning. It should be appreciated that other configuration events can be managed at act 1120, like femto AP service deactivation and shutdown. In an aspect of the subject specification, customer care/support agents can manage configuration of a femto AP, comprising address validation, white list(s) management, provisioning, and so forth. At act 1130, the femto AP is operated. Operation can comprise various aspects such as accessing agreed service (e.g., voice and data), requesting customer support, which can be provided through a networked interface (e.g., web-based, or voice-based), receiving and acting upon billing, maintaining the femto AP, like downloading software for security features or customized service, and so forth.

Figure 12A:
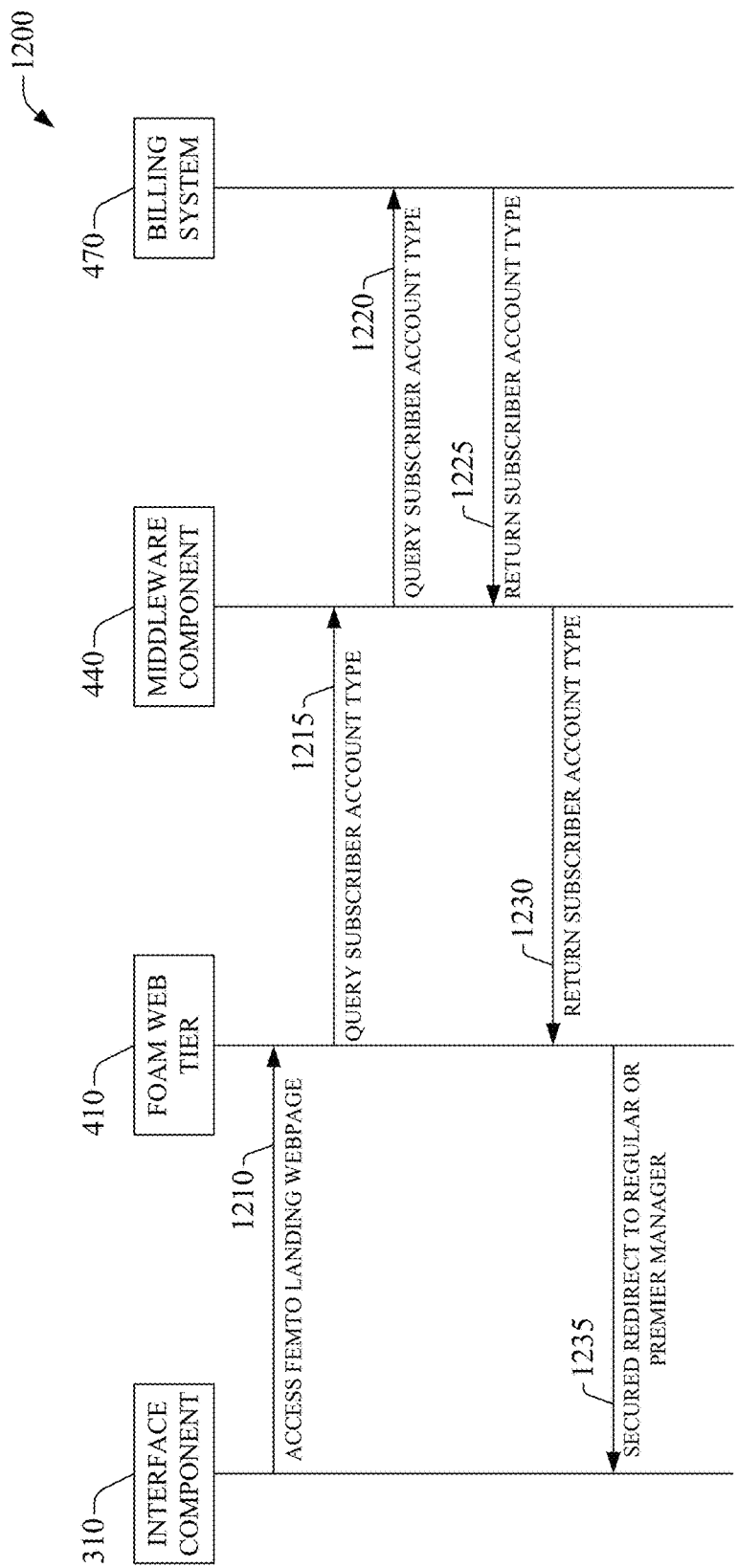
FIGS. 12A-12B illustrate example call flows for logging in into an account management service according to aspects of the subject specification.

FIG. 12A illustrates an interaction diagram 1200 or call flow for an example method for logging in into an account management service according to aspects of the subject specification. As illustrated various components can enact portions of the login call flow. In an aspect, server(s) or processor(s) associated with the various components and that provide functionality thereto can enable enacting, at least in part, the subject example method. Interface component 310 accesses femto landing webpage at 1210; the landing webpage can be hosted in FOAM web tier 410. To determine a type of subscriber account and direct login to a proper legacy account manager, FOAM web tier 410 conveys at 1215 a query to extract subscriber account type, which can be either a consumer account or a business or enterprise account. In an aspect, the query is based at least in part on a subscriber CTN provided through the femto landing webpage. Subscriber account type query is conveyed to middleware component 440, which at 1220 relays the query to billing system 470. It is noted that in an alternative or additional example call flow or method, subscriber account type identification can be provided by a customer care platform, e.g., 230. Billing system, 470, at 1225, returns or conveys a subscriber account type, wherein the account type can be extracted through a received subscriber CTN and subscriber mobility profile(s) retained in a directory database, e.g., 480, or subscriber database. Middleware component 440 receives subscriber account type indication and relays it to FOAM web tier 410 at act 1230. FOAM web tier 410 receives the indication of subscriber account type and at 1235 securely redirects interface component 310 to consumer manager 424 or business manager 428 component when the account type is, respectively, of the consumer or business type. In an aspect, secure redirection can be based on hypertext transfer protocol secure (HTTPS) protocol with advanced encryption standard (AES) based at least in part on 256 bit encryption key(s).

Figure 12B:
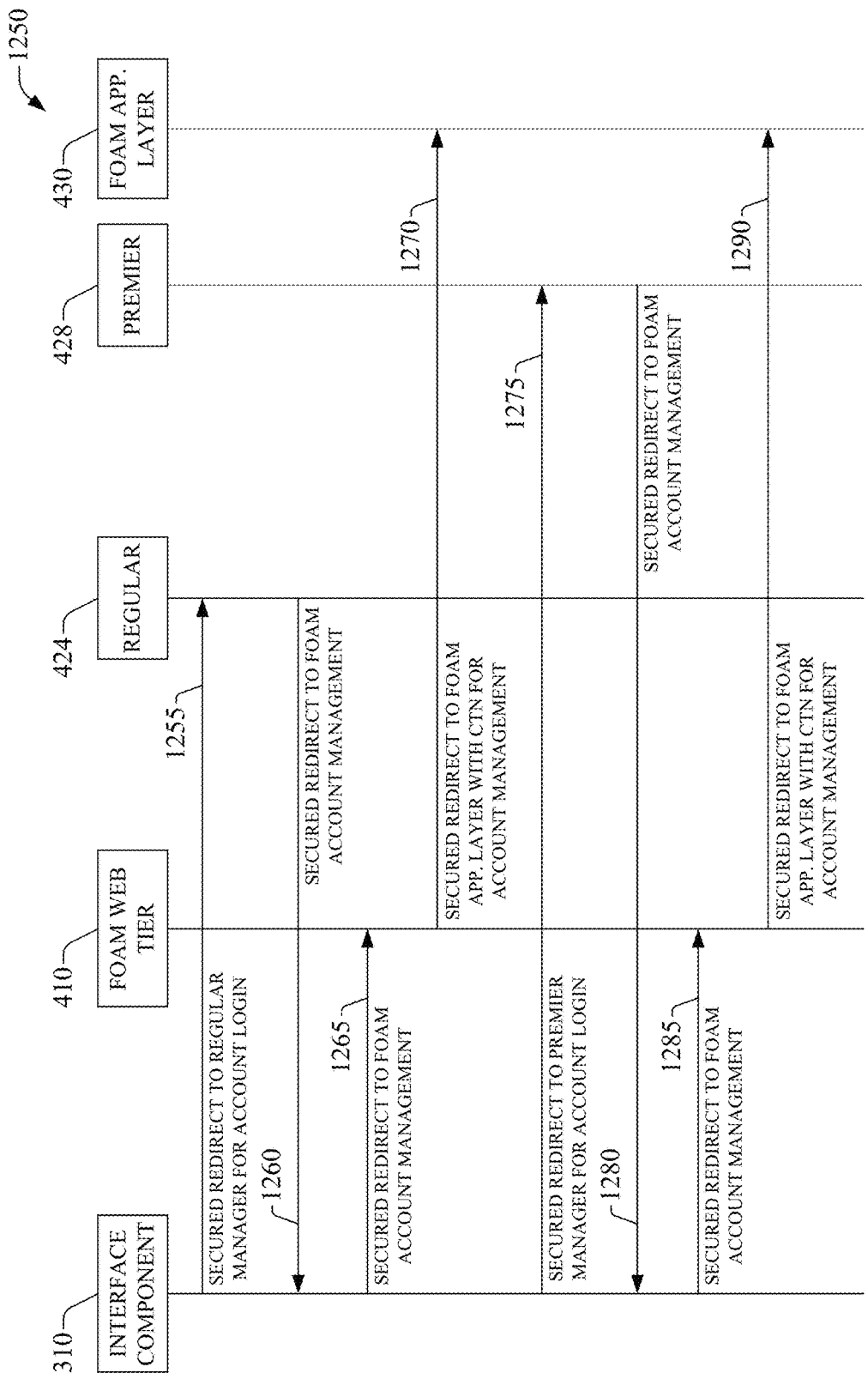

FIG. 12B is an example interaction diagram or call flow 1250 for logging in into an account management service according to aspects of the subject specification. At 1255, interface component 310 securely redirects to consumer manager component 424 for account login. As mentioned supra, redirection act can be secured through HTTPS with AES based at least in part on 256 encryption key(s). At 1260, upon successful login, which can comprise at least password exchange, consumer account manager component 424 securely redirects interface component to FOAM account management. At 1265, interface component 310 securely redirects to FOAM account management interface within FOAM web tier 410. At 1270, FOAM web tier securely redirects to FOAM application layer 430 with CTN for account management. Acts 1255 through 1270 allow account management for a consumer type account. When an account to be managed is a business account, interface component 310 securely redirects to business manager component 428 for account login. At 1280, upon successful login, which can be based at least on a password exchange, business manager component 428 securely redirects interface component 310 to FOAM account management. In an aspect, when interface component 310 is a consumer web browser, such redirection switches a rendered webpage conveyed to a subscriber. In particular, content of a rendered webpage upon redirection can comprise content customized to the subscriber. At 1285, interface component 310 securely redirects to FOAM web tier 410 for FOAM account management. At 1290, FOAM web tier 410 securely redirects to FOAM application layer 430 with CTN for account management. As mentioned supra, redirection act can be secured through HTTPS with AES based at least in part on 256 encryption key(s).

FIGS. 13A-13B illustrate an example interaction diagram or call flow 1250 for managing an access list according to aspects of the subject specification. At 1305, interface component 310 selects femto account management option within femto web tier 410. Such selection can specify a particular femto AP, e.g., via an EID. At 1310, femto web tier 410 retrieves account profile for an identified EID. FOAM application layer 430 can enable, at least in part, such extraction. At 1315, FOAM application layer 430 forwards or conveys the account profile for the specified EID to middleware component 440, which at 1320 requests an access list associated with the account profile for the specified EID from femto database manager 1010. At 1325, femto database manager 1010 returns to middleware component 440 the requested access list associated with the account profile for EID. Middleware component 440, at act 1330, forwards or delivers the access list associated with the account profile for the EID to FOAM application layer 430, which relays the access list to FOAM web tier 410. At 1340, interface component 310 displays the access list associated with the account profile for EID. At 1345, FOAM web tier 410, through femto management interface 515, e.g., a graphic user interface (GUI), posts an update for the access list associated with the account profile for the specified EID. The update is conveyed to FOAM application layer 430, which relays the update to middleware component 440 at 1350. Middleware component 440 verifies that mobile device numbers in updated access list are service provider CTNs. In addition, middleware component 440 can retrieve ICCIDs associated with the CTNs.

As illustrated in FIG. 13B, in response to verification, femto database manager 1010 can return access list numbers with errors for exception handling. Middleware component 440 can receive and relay such access list numbers to FOAM application layer 430 at 1365. FOAM application layer 430 can receive access list numbers with errors and convey such numbers to FOAM web tier 410, e.g., femto management interface 515 can receive and convey such numbers. In turn, FOAM web tier 410 can return access lists numbers with errors to interface component 310, e.g., a subscriber web browser executed in a computing device, for exception handling such as revision of updated number(s) within access list. Alternatively, for verified number(s) in an updated access list, at 1380, femto database manager 1010 can return the verified number(s) with associated ICCID(s). In addition, at 1385, femto database management 1010 can return control to interface component 310.

FIG. 14 illustrates an example interaction diagram 1400 for supplying access list(s) to a femtocell network component and a macrocell network component according to aspects described herein. Availability of access list(s) can enable macrocell network, through an over-the-air (OTA) server, to supply access list(s) and updates thereof to mobile devices comprised within the access list(s). At 1410, middleware component 440 provisions update for an access list associated with an account profile for a specific EID. Additionally, or alternatively, middleware component 440 delivers an old access list and an updated access list with associated ICCIDs for listed mobile device identifiers. At 1430, network provisioning component 1410 conveys the updated access list with the associated EID and CTN of the access list owner to a femto provisioning server 1120; the access list owner is a subscriber that owns or leases the femto AP identified through the EID. In an aspect, femto provisioning server 1120 can deliver an access list updated to the femto AP identified through the EID. Network provisioning component 1410 also can determine a difference amongst the old access list associated with the EID and the updated access list related thereto, and convey the difference to OTA server 1130 in order to initiate a transaction update. Transaction update can be enabled through a communication protocol between network components and can proceed in accordance with predetermined variables and settings thereof.

In an aspect of the subject specification, when a subscriber is comprised in an access list, network provisioning component 1410 can administer provisioning transactions to OTA server 1430 through an simple object access protocol application program interface with a Boolean parameter, e.g., "femtowhitelist," set to true. Such a transaction generally requires the subscriber's ICCID, which is part of an account profile and the aforementioned Boolean parameter. In an aspect, middleware component 440 can deliver a subscriber's CTN and associated ICCID by querying directory database 480 and conveying extracted information to network provisioning component 1410. As indicated in call flow 1400, network provisioning component 1410 can deliver changes to an original access list in order to initiate a transaction update to the OTA server 1430. Such transaction update can enable activating, over the air, a mobile device that is comprised within an access list in order for the device to utilize multiple radio technologies, in particular legacy radio technologies.

Figure 15:
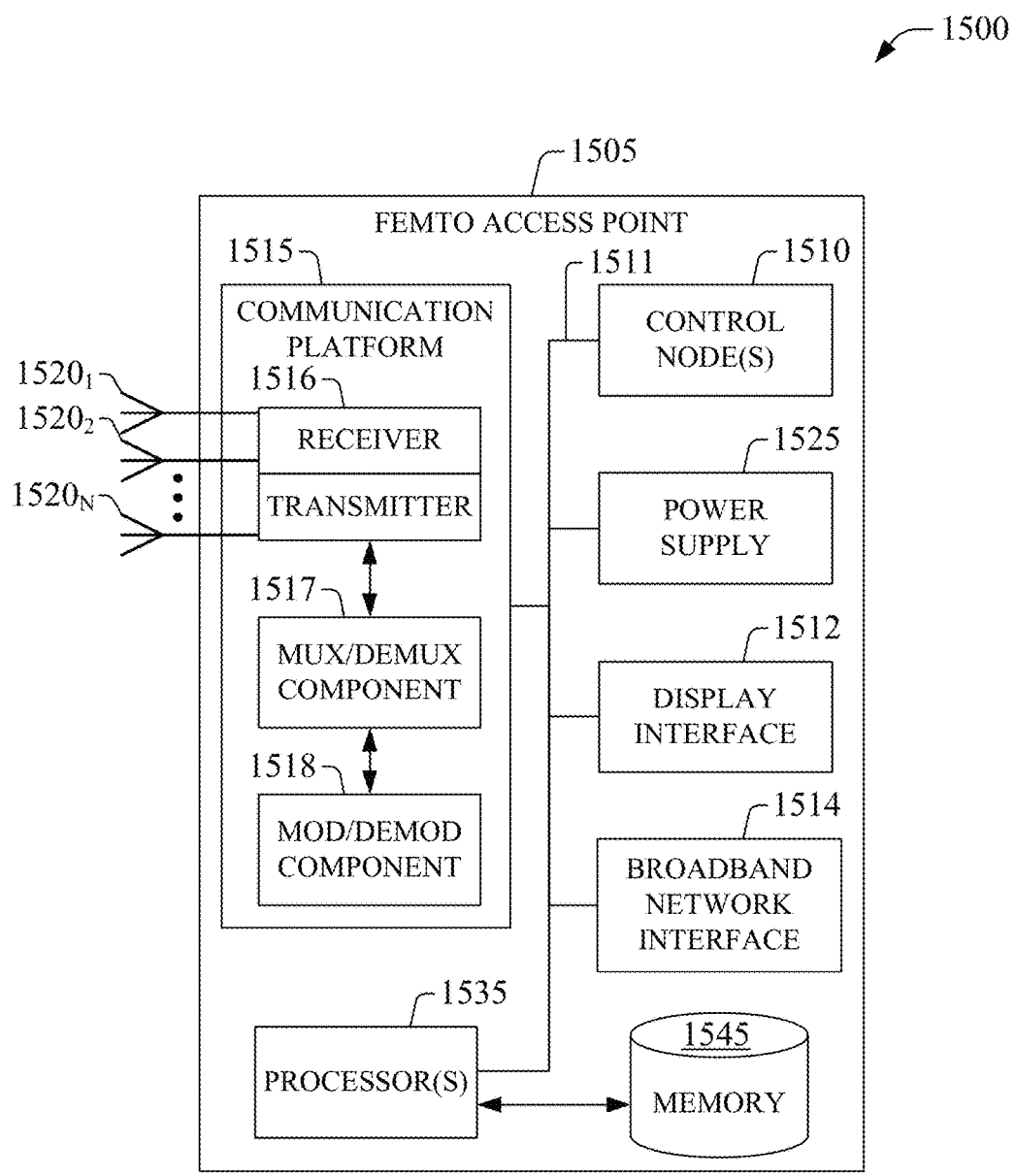
FIG. 15 is a block diagram of an example femto access point that operates in accordance with aspects disclosed in the subject specification.
Figure 16:
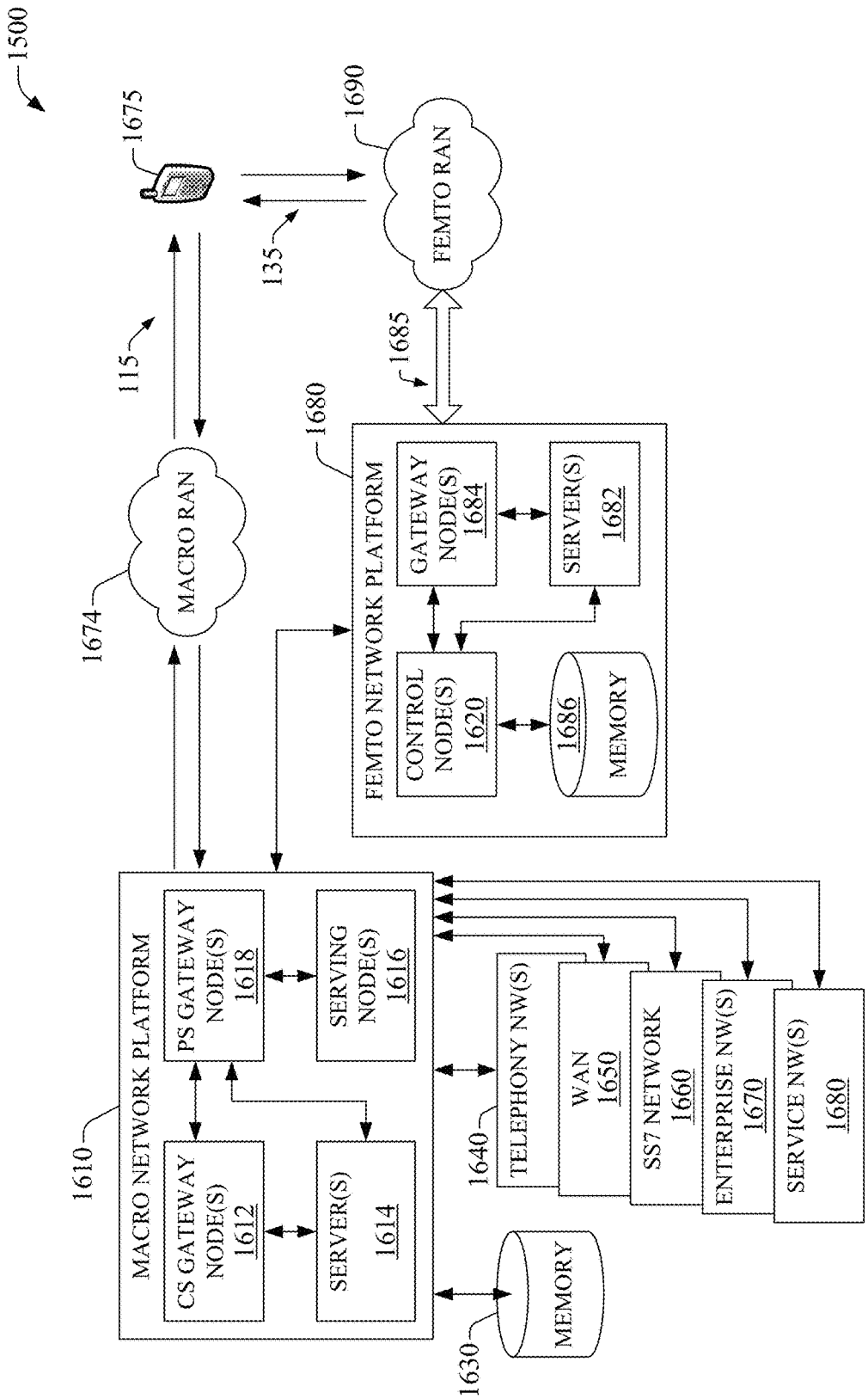
FIG. 16 is a block diagram of an example wireless network environment that comprises macro and femto network platforms and can implement and exploit aspects or features described herein.

To provide further context for various aspects of the subject specification, FIG. 15 and FIG. 16 illustrate, respectively, a block diagram of an example embodiment 1500 of a femtocell access point that can enable or exploit features or aspects of the subject specification, and example wireless network environment 1600 that comprises femto and macro network platforms and that can enable or exploit aspects or features of the subject specification described herein, and utilize femto APs that exploit aspects of the subject specification in accordance with various aspects described herein.

In embodiment 1500, femto AP 1505 can receive and transmit signal(s) (e.g., attachment signaling) from and to wireless devices like femto access points, access terminals, wireless ports and routers, or the like, through a set of antennas $1520_1$-$1520_N$ (N is a positive integer). It should be appreciated that antennas $1520_1$-$1520_N$ embody antenna(s) component 217, and are a part of communication platform 1515, which comprises electronic components and associated circuitry that provides for processing and manipulation of received signal(s) and signal(s) to be transmitted. Such electronic components and circuitry embody at least in part signaling detection component 285; communication platform 1515 operates in substantially the same manner as communication platform 504 described hereinbefore. In an aspect, communication platform 1515 comprises a receiver/transmitter 1516 that can convert signal from analog to digital upon reception, and from digital to analog upon transmission. In addition, receiver/transmitter 1516 can divide a single data stream into multiple, parallel data streams, or perform the reciprocal operation. Coupled to receiver/transmitter 1516 is a multiplexer/demultiplexer (mux/demux) component 1517 that facilitates manipulation of signal in time and frequency space. Electronic component 1517 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1517 can scramble and spread information (e.g., codes) according to substantially any code known in the art; e.g., Hadamard-Walsh codes, Baker codes, Kasami codes, polyphase codes, and so on. A modulator/demodulator (mod/demod) 1518 is also a part of communication platform 1515, and can modulate information according to multiple modulation techniques, such as frequency modulation, amplitude modulation (e.g., M-ary quadrature amplitude modulation (QAM), with M a positive integer), phase-shift keying (PSK), and the like Femto access point 1505 also comprises processor(s) 1535 configured to confer, and that confers, at least in part, functionality to substantially any component platform or interface, and related circuitry in femto AP 1505. In particular, processor(s) 1535 can enable, at least part, configuration of femto AP 1505, via control node(s) 1510. In an aspect, control node(s) 1510 can provision or configure an identifier code such as SAC for femto AP 1505, wherein the identifier code can be retained in memory 1545. In another aspect, control node(s) 1510 can supply system messages that can be broadcasted via communication platform 1515. In yet another aspect, control node(s) 1510 can autonomously adjust, as dictated at least in part by handover component 254, transmitted power of pilot signal(s) delivered through communication platform 1515 to mitigate signaling among a mobile device that hands over from macrocell coverage to femto coverage served through femto AP 1505.

Additionally, femto AP 1505 comprises display interface 1512, which can display functions that control functionality of femto AP 1505, or reveal operation conditions thereof. In addition, display interface 1512 can comprise a screen to convey information to an end user. In an aspect, display interface 1512 can be a liquid crystal display (LCD), a plasma panel, a monolithic thin-film based electrochromic display, and so on. Moreover, display interface can also comprise a component (e.g., speaker(s)) that facilitates communication of aural indicia, which can also be employed in connection with messages that convey operational instructions to an end user. Display interface 1512 also facilitates data entry (e.g., through a linked keypad or via touch gestures), which can facilitated femto AP 1505 to receive external commands (e.g., restart operation).

Broadband network interface facilitates connection of femto AP 1505 to femto network via backhaul link(s) 153 (not shown in FIG. 15), which enables incoming and outgoing data flow. Broadband network interface 1514 can be internal or external to femto AP 1505, and it can utilize display interface 1512 for end-user interaction and status information delivery.

In an aspect, femto AP 1505 comprises power supply 1525, which can deliver to components or functional elements within femto AP 1505, and can regulate power output of wireless signal(s) emitted there from. In an aspect, power supply 1525 can attach to a conventional power grid and comprise one or more transformers to achieve power level(s) that can operate femto AP 1505 components, functional elements, and related circuitry. Additionally, power supply 1525 can comprise a rechargeable power component, e.g., a rechargeable battery, to ensure operation when femto AP 1505 is disconnected from the power grid.

Processor(s) 1535 also is functionally connected to communication platform 1515 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor(s) 1535 is functionally connected, via data, system, or address bus 1511, to display interface 1512 and broadband network interface 1514 to confer, at least in part functionality to each of such components.

Memory 1545 also can store data structures, code instructions and program modules, or substantially any type of software or firmware; system or device information; code sequences hypotheses, and modulation and multiplexing hypotheses; spreading and pilot transmission; femto AP floor plan configuration; and so on. Furthermore, memory 1545 also can retain content(s) (e.g., multimedia files, subscriber-generated data); security credentials (e.g., passwords, encryption keys, digital certificates, biometric reference indicators like voice recordings, iris patterns, fingerprints); or the like. It is noted that memory 1545 can be internal to femto AP 1505 and comprise removable and stationary memory elements, or it can be an offline memory that is external to the femto AP 1505 and is functionally coupled thereto through one or more links or interfaces, e.g., USB, general purpose interface bus (GPIB), IEEE 1394, or the like. As an example, an offline memory can be a memory within a server within a confined wireless environment served through femto AP 1505.

Processor(s) 1535 is functionally coupled, e.g., via a memory bus, to the memory 1545 in order to store and retrieve information necessary to operate and/or confer functionality to the components, platform, and interface that reside within femto access point 1505.

With respect to FIG. 16, wireless communication environment 1600 comprises two wireless network platforms: (i) A macro network platform 1610 which serves, or facilitates communication with user equipment 1675 (e.g., mobile 120$_A$) via a macro radio access network (RAN) 1674. It should be appreciated that in cellular wireless technologies (e.g., 3GPP UMTS, HSPA, 3GPP LTE, 3GPP UMTS, 3GPP2 UMB), macro network platform 1610 is embodied in a Core Network. (ii) A femto network platform 1680, which can provide communication with UE 1675 through a femto RAN 1690, which is linked to the femto network platform 1680 via backhaul pipe(s) 1685 (e.g., backhaul link(s) 153). It should be appreciated that macro network platform 1610 typically hands off UE 1675 to femto network platform 1610 once UE 1675 attaches, e.g., through macro-to-femto handover as described herein, to femto RAN 1690, which comprises a set of deployed femto APs (e.g., femto AP 130) that can operate in accordance with aspects described herein.

It is noted that RAN comprises base station(s), or access point(s), and its associated electronic circuitry and deployment site(s), in addition to a wireless radio link operated in accordance with the base station(s). Accordingly, macro RAN 1674 can comprise various coverage cells like cells 105, while femto RAN 1690 can comprise multiple femtocell access points such as femto AP 130. Deployment density in femto RAN 1690 is substantially higher than in macro RAN 1674.

Generally, both macro and femto network platforms 1610 and 1680 comprise components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject specification, macro network platform 1610 comprises CS gateway node(s) 1612 which can interface CS traffic received from legacy networks like telephony network(s) 1640 (e.g., public switched telephone network (PSTN), or public land mobile network (PLMN)) or a signaling system No. 7 (SS7) network 1660. Circuit switched gateway 1612 can authorize and authenticate traffic (e.g., voice) arising from such networks. Additionally, CS gateway 1612 can access mobility, or roaming, data generated through SS7 network 1660; for instance, mobility data stored in a VLR, which can reside in memory 1630. Moreover, CS gateway node(s) 1612 interfaces CS-based traffic and signaling and gateway node(s) 1618. As an example, in a 3GPP UMTS network, PS gateway node(s) 1618 can be embodied in gateway GPRS support node(s) (GGSN).

In addition to receiving and processing CS-switched traffic and signaling, PS gateway node(s) 1618 can authorize and authenticate PS-based data sessions with served (e.g., through macro RAN) wireless devices. Data sessions can comprise traffic exchange with networks external to the macro network platform 1610, like wide area network(s) (WANs) 1650, enterprise networks (NW(s)) 1670 (e.g., enhanced 911), or service NW(s) 1680 like IP multimedia subsystem; it should be appreciated that local area network(s) (LANs), which may be a part of enterprise NW(s), can also be interfaced with macro network platform 1610 through PS gateway node(s) 1618. Packet-switched gateway node(s) 1618 generates packet data contexts when a data session is established. To that end, in an aspect, PS gateway node(s) 1618 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 1614. It is to be noted that in 3GPP UMTS network(s), PS gateway node(s) 1618 (e.g., GGSN) and tunnel interface (e.g., TTG) comprise a packet data gateway (PDG).

Macro network platform 1610 also comprises serving node(s) 1616 that convey the various packetized flows of information, or data streams, received through PS gateway node(s) 1618. As an example, in a 3GPP UMTS network, serving node(s) can be embodied in serving GPRS support node(s) (SGSN).

As indicated above, server(s) 1614 in macro network platform 1610 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 1610. Data streams can be conveyed to PS gateway node(s) 1618 for authorization/authentication and initiation of a data session, and to serving node(s) 1616 for communication thereafter. Server(s) 1614 also can effect security (e.g., implement one or more firewalls) of macro network platform 1610 to ensure network's operation and data integrity in addition to authorization and authentication procedures that CS gateway node(s) 1612 and PS gateway node(s) 1618 can enact. Moreover, server(s) 1614 can provision services from external network(s), e.g., WAN 1650, or Global Positioning System (GPS) or GNSS network(s), which can be a part of enterprise NW(s) 1680. It is to be noted that server(s) 1614 can comprise at least one of a memory, one or more processors configured to confer at least in part the functionality of macro network platform 1610, and a bus which can comprise a memory bus, a system bus, an address bus or one or more reference link(s). To that end, the one or more processor can execute code instructions (not shown) stored in memory 1630, for example.

In example wireless environment 1600, memory 1630 stores information related to operation of macro network platform 1610. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 1630 can also store information from at least one of telephony network(s) (NW(s)) 1640, WAN 1650, SS7 network 1660, enterprise NW(s) 1670, or service NW(s) 1680.

Regarding femto network platform 1680, it comprises a femto gateway node(s) 1684, which have substantially the same functionality as PS gateway node(s) 1618. Additionally, femto gateway node(s) 1684 can also comprise substantially all functionality of serving node(s) 1616. Disparate gateway node(s) 1684 can control or operate disparate sets of deployed femto APs, which can be a part of femto RAN 1690. In an aspect of the subject specification, femto gateway node(s) 1684 can operate in substantially the same manner as gateway node(s) 242. Control node(s) 1620 can operate in substantially the same manner as control node(s) 253, and can be distributed at least in part across a plurality of femto access points that are part of RAN 1690.

Memory 1686 can retain additional information relevant to operation of the various components of femto network platform 1680. For example operational information that can be stored in memory 1686 can comprise, but is not limited to, subscriber intelligence; contracted services; maintenance and service records; femtocell configuration (e.g., devices served through femto RAN 1690; authorized subscribers associated with one or more deployed femto APs); service policies and specifications; privacy policies; add-on features; so forth.

Server(s) 1682 have substantially the same functionality as described in connection with server(s) 1614. In an aspect, server(s) 1682 can execute multiple application(s) that provide service (e.g., voice and data) to wireless devices served through femto RAN 1690. Server(s) 1682 can also provide security features to femto network platform. In addition, server(s) 1682 can manage (e.g., schedule, queue, format . . . ) substantially all packetized flows (e.g., IP-based, frame relay-based, ATM-based) it generates in addition to data received from macro network platform 1610. Furthermore, server(s) 1682 can effect provisioning of femtocell service, and effect operations and maintenance. It is to be noted that server(s) 1682 can comprise at least one of a memory, one or more processors configured to provide at least in part the functionality of femto network platform 1680, and a bus which can comprise a memory bus, a system bus, an address bus or one or more reference link(s). To that end, the one or more processors can execute code instructions (not shown) stored in memory 1686, for example.

It is noted that femto network platform 1680 and macro network platform 1610 can be functionally connected through one or more reference link(s) or reference interface(s). In addition, femto network platform 1680 can be functionally coupled directly (not illustrated) to one or more of external network(s) 1640-1680. Reference link(s) or interface(s) can functionally link at least one of gateway node(s) 1684 or server(s) 1682 to the one or more external networks 1640-1680.

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject specification can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject specification can comprise legacy telecommunication technologies.

As it employed in the subject specification, the term "processor" can refer to substantially any computing processing unit or device comprising, but not limited to comprise, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "repository," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; add-on features, geographical location tolerances, and so forth. It will be appreciated that the memory components described herein can be either volatile memory or nonvolatile memory, or can comprise both volatile and nonvolatile memory.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, aspects or features of the subject specification described herein also can be implemented through program modules stored in a memory and executed by a processor, or other combination of hardware and software. The term "article of manufacture" as used herein is intended to encompass a computer program accessible from any computer-readable device, carrier, or media. For example, computer readable media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above comprises examples of systems and methods that provide advantages of the subject specification. It is, of course, not possible to describe every conceivable combination of components or methodologies for purposes of describing the subject specification, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
     determining that a user equipment has been authorized to access a femto access point device; and
     in response to the determining, facilitating a transmission of a data signal indicative of display data to the user equipment, wherein the display data represents the femto access point device and distinguishes the femto access point device from macro access point devices, wherein the display data is employable to update a network indicator display to generate an updated network indicator display that is presented via the user equipment in response to a determination that the user equipment has coupled to the femto access point device, and wherein the updated network indicator display depicts that an access point device, to which the user equipment is coupled, belongs to a femto access network.

2. The system of claim 1, wherein the facilitating comprises facilitating the transmission via a text message.

3. The system of claim 1, wherein the display data comprises identifier data indicative of an identifier of the femto access point device.

4. The system of claim 1, wherein the display data comprises tag data representing an alphanumeric network display indicator associated with the femto access point device.

5. The system of claim 1, wherein the display data is enabled to be presented in response to determining that a first fee associated with directing communication data between the user equipment and the femto access point device is different from a second fee associated with directing the communication data between the user equipment and a macro access point device of the macro access point device.

6. The system of claim 1, wherein the user equipment is a first user equipment, wherein the operations further comprise:
   receiving, from a second user equipment, provisioning data that comprises identifier data indicative of the first user equipment, wherein the provisioning data is employable to configure an access control data structure that is employable to control access to the femto access point device, and wherein the determining that the first user equipment has been authorized to access the femto access point device comprises determining that the first user equipment has been authorized to access the femto access point device in response to the receiving.

7. The system of claim 6, wherein the receiving comprises receiving the provisioning data via a web portal presented via a network device.

8. The system of claim 7, wherein the web portal comprises a first demarcation zone representing a first online account management web tier for management of a femtocell account and a second demarcation zone representing a second online account management web tier for management of a macrocell account.

9. The system of claim 6, wherein the identifier data is first identifier data, and wherein the operations further comprise:

mapping the first identifier data to second identifier data employable by network devices; and storing the second identifier data in the access control data structure.

10. A method, comprising:

configuring, by a system comprising a processor, an access control data structure that is employable to control access to a femto access point device, wherein the configuring comprises storing, within the access control data structure, identifier data indicative of a user equipment that is authorized to access the femto access point device; and in response to the configuring, directing, by the system, a data signal indicative of display data to the user equipment, wherein the display data represents the femto access point device and differentiates the femto access point device from macro access point devices, wherein the directing facilitates an update to network indicator display data to generate an updated network indicator display data that is presentable via the user equipment in response to a determination that the user equipment has coupled to the femto access point device, and wherein the updated network indicator display illustrates that the femto access point device, to which the user equipment is coupled, belongs to a femto network category.

11. The method of claim 10, wherein the directing comprises directing identifier data indicative of an identifier of the femto access point device.

12. The method of claim 10, wherein the directing comprises directing tag data representing an alphanumeric network display indicator associated with the femto access point device.

13. The method of claim 10, wherein the directing comprises directing a text message.

14. The method of claim 10, wherein the configuring comprises configuring the access control data structure based on input data received from a device that is determined to have been authorized to configure the access control data structure.

15. The method of claim 14, further comprising:

receiving, by the system, the input data from a customer care platform device.

16. The method of claim 14, wherein the user equipment is a first user equipment, and wherein the method further comprises:

receiving, by the system, the input data from a second user equipment.

17. A non-transitory machine-readable storage medium, comprising executable instructions that, when executed by a processor, facilitate performance of operations, comprising:

determining that a user equipment has been authorized to access a femto access point device; and in response to the determining, instructing, via a transmission of a data signal, the user equipment to update, in response to being coupled to the femto access point device, a network indicator display, presentable via the user equipment, with identification data associated with the femto access point device to generate an updated network indicator display that is employable to indicate that an access point device, to which the user equipment is coupled, belongs to a femto access network.

18. The non-transitory machine-readable storage medium of claim 17, wherein the instructing comprises facilitating a transfer of the identification data to the user equipment.

19. The non-transitory machine-readable storage medium of claim 18, wherein the facilitating the transfer comprises facilitating a transfer of the identification data via a text message.

20. The non-transitory machine-readable storage medium of claim 17, wherein the identification data comprises an alphanumeric network display indicator associated with the femto access point device.

* * * * *